(12) United States Patent
Troedson et al.

(10) Patent No.: US 11,669,128 B1
(45) Date of Patent: Jun. 6, 2023

(54) STATION FOR PORTABLE ELECTRONIC COMPUTING DEVICES

(71) Applicant: Pioneer Square Brands, Inc., Seattle, WA (US)

(72) Inventors: Emelie Elna Victoria Troedson, Seattle, WA (US); Brian Lewis Piper, Seattle, WA (US)

(73) Assignee: Pioneer Square Brands, Inc., McLean, VA (US)

( * ) Notice: Subject to any disclaimer, the term of this patent is extended or adjusted under 35 U.S.C. 154(b) by 0 days.

(21) Appl. No.: 18/070,158

(22) Filed: Nov. 28, 2022

(51) Int. Cl.
*G06F 1/16* (2006.01)

(52) U.S. Cl.
CPC .................................. *G06F 1/1632* (2013.01)

(58) Field of Classification Search
CPC ..................................................... G06F 1/1632
See application file for complete search history.

(56) References Cited

U.S. PATENT DOCUMENTS

| | | | | |
|---|---|---|---|---|
| 5,052,943 | A * | 10/1991 | Davis | H02J 7/0042 439/298 |
| 5,517,434 | A * | 5/1996 | Hanson | H02J 7/0044 361/679.56 |
| 5,621,890 | A * | 4/1997 | Notarianni | G06F 21/31 710/303 |
| 5,978,569 | A * | 11/1999 | Traeger | G06F 1/1626 710/64 |
| 6,375,344 | B1 * | 4/2002 | Hanson | G06F 1/3203 361/679.56 |
| 7,480,138 | B2 * | 1/2009 | Kogan | H04M 1/04 361/679.02 |
| 8,183,825 | B2 * | 5/2012 | Sa | G06F 1/1626 320/112 |
| 8,441,787 | B2 * | 5/2013 | Pine | G06F 1/1632 361/679.41 |
| 8,675,356 | B2 * | 3/2014 | Strauser | G06F 1/1632 361/679.44 |
| 9,298,225 | B2 * | 3/2016 | Lindblad | G06F 1/1607 |
| 10,148,104 | B2 * | 12/2018 | Sa | H04M 1/04 |
| 10,454,515 | B2 * | 10/2019 | Carnevali | H04M 1/185 |
| 10,700,483 | B1 * | 6/2020 | Piper | G06F 1/1632 |
| D977,481 | S * | 2/2023 | Troedson | D14/434 |
| 2004/0057199 | A1 * | 3/2004 | Azuchi | H04M 1/72409 361/679.41 |
| 2007/0002533 | A1 * | 1/2007 | Kogan | G06F 1/1632 361/679.41 |
| 2007/0216352 | A1 * | 9/2007 | Shaddie | H02J 7/0013 320/114 |
| 2008/0232061 | A1 * | 9/2008 | Wang | G06F 1/1632 361/679.41 |
| 2010/0176762 | A1 * | 7/2010 | Daymude | H02J 7/0044 320/110 |

(Continued)

*Primary Examiner* — Lisa Lea-Edmonds
(74) *Attorney, Agent, or Firm* — Grandview Law

(57) ABSTRACT

Systems and methods involve a case, adapter, and portable electronic device, the system includes at least one base; at least two walls positioned on either side of the at least one base; at least one slot defined at least in part by the at least two walls and the at least one base; at least one post extending from the at least one base; and at least one interface including at least one electrically conductive contact extending from the at least one base. In addition, other aspects are described in the claims, drawings, and text forming a part of the present disclosure.

17 Claims, 26 Drawing Sheets

(56) References Cited

U.S. PATENT DOCUMENTS

| | | | | |
|---|---|---|---|---|
| 2011/0134600 A1* | 6/2011 | Pine | ..................... | G06F 1/1632 |
| | | | | 361/679.41 |
| 2011/0242754 A1* | 10/2011 | Morton | ................... | H01Q 1/46 |
| | | | | 29/601 |
| 2015/0248141 A1* | 9/2015 | Singleton | .............. | H02J 7/0044 |
| | | | | 361/679.41 |

* cited by examiner

STATION FOR PORTABLE ELECTRONIC COMPUTING DEVICES

SUMMARY

In one or more aspects a system can include a system including at least one base; at least two walls positioned on either side of the at least one base; at least one slot defined at least in part by the at least two walls and the at least one base; at least one post extending from the at least one base; and at least one interface including at least one electrically conductive contact extending from the at least one base. Wherein the at least one electrically conductive contact includes at least two posts positioned on either side of the at least one interface. Wherein the at least one base includes at least one elevated base portion and at least one lower base portion positioned lower than the at least one elevated base portion. Wherein the at least one lower base portion includes at least two lower base portions positioned on either side of the at least one elevated base portion. Wherein the at least one base includes at least one bevel portion positioned between the at least one lower base portion and the at least one elevated base portion. Wherein the at least one interface and the at least one post extend from the at least one elevated base portion. Wherein the at least one slot includes at least one first slot and at least one second slot, and wherein the at least one base portion of the at least one first slot is positioned lower than the at least one base portion of the at least one second slot. Wherein the at least one electrically conductive contact adjustably extend from the at least one base. Wherein the at least one electrically conductive contact adjustably extend through spring-loaded bias from the at least one base. Wherein the at least one electrically conductive contact extend in lesser extent in a first direction when force is applied to the at least one electrically conductive contact in a second direction opposite to the first direction. Wherein the at least one electrically conductive contact include electrically conductive pogo pins. Wherein the at least one electrically conductive contact conduct electrical current to provide electrical power. Wherein the at least one electrically conductive contact conduct electrical current for communication. Wherein the at least one post includes a tapered shape. Wherein the at least one post includes a height of between one quarter inches and three quarters inches. Wherein the at least one post includes a height of at least three eighths inches. Wherein the at least one post is electrically nonconductive. Wherein the at least slot includes a plurality of slots.

In one or more aspects, a system including (I) a case with at least one aperture; and (II) a station including (A) at least one base, (B) at least two walls positioned on either side of the at least one base, (C) at least one slot defined at least in part by the at least two walls and the at least one base, (D) at least one electrically nonconductive post extending from the at least one base, and (E) at least one interface including at least one electrically conductive contact extending from the at least one base; wherein the at least one electrically nonconductive post of the station is positioned in the at least one aperture of the case when the case is coupled with the station.

In one or more aspects, a system including (I) a case including at least one aperture; (II) a station including (A) at least one base, (B) at least two walls positioned on either side of the at least one base, (C) at least one slot defined at least in part by the at least two walls and the at least one base, (D) at least one electrically nonconductive post extending from the at least one base, and (E) at least one interface including at least one electrically conductive contact extending from the at least one base; and (III) an adapter including at least one electrically conductive contact, the adapter being couplable with the case; wherein the at least one electrically nonconductive post of the station is positioned in the at least one aperture of the case and the at least one electrically conductive contact of the station is in contact with the at least one electrically conductive contact of the adapter when the case is coupled with the station and the adapter is coupled with the case.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a station for portable electronic device systems, articles of manufacture, compositions of matter for same that may provide context, for instance, in introducing one or more processes and/or devices described herein.

DETAILED DESCRIPTION

Figure 1:
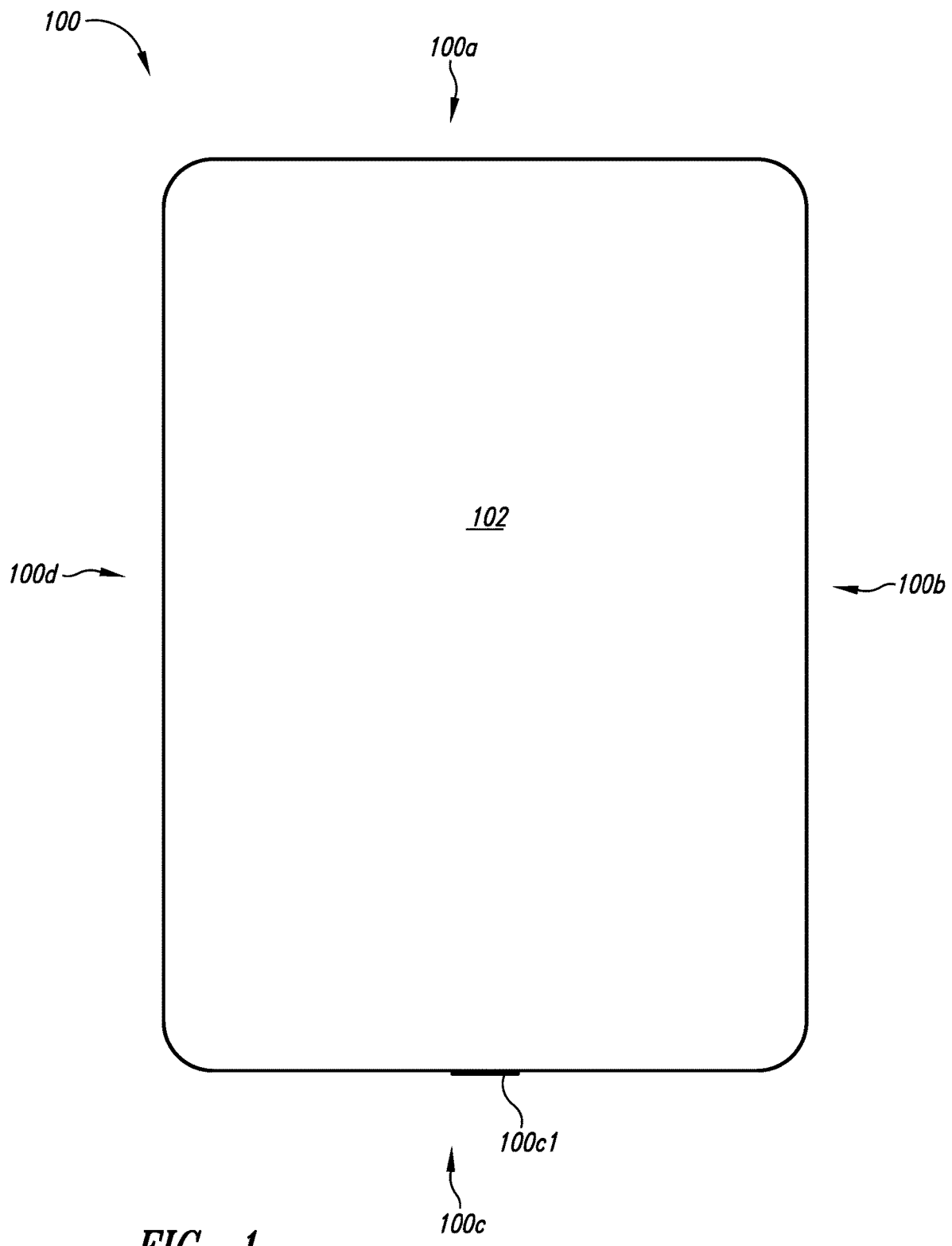
FIG. 1 is a front elevational view of a portable electronic device.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front elevational view of a portable electronic device. In implementations, portable electronic device 100 is shown to include side 100a, side 100b, side 100c, side 100d, display surface 102, and port 100c1.

Figure 2:
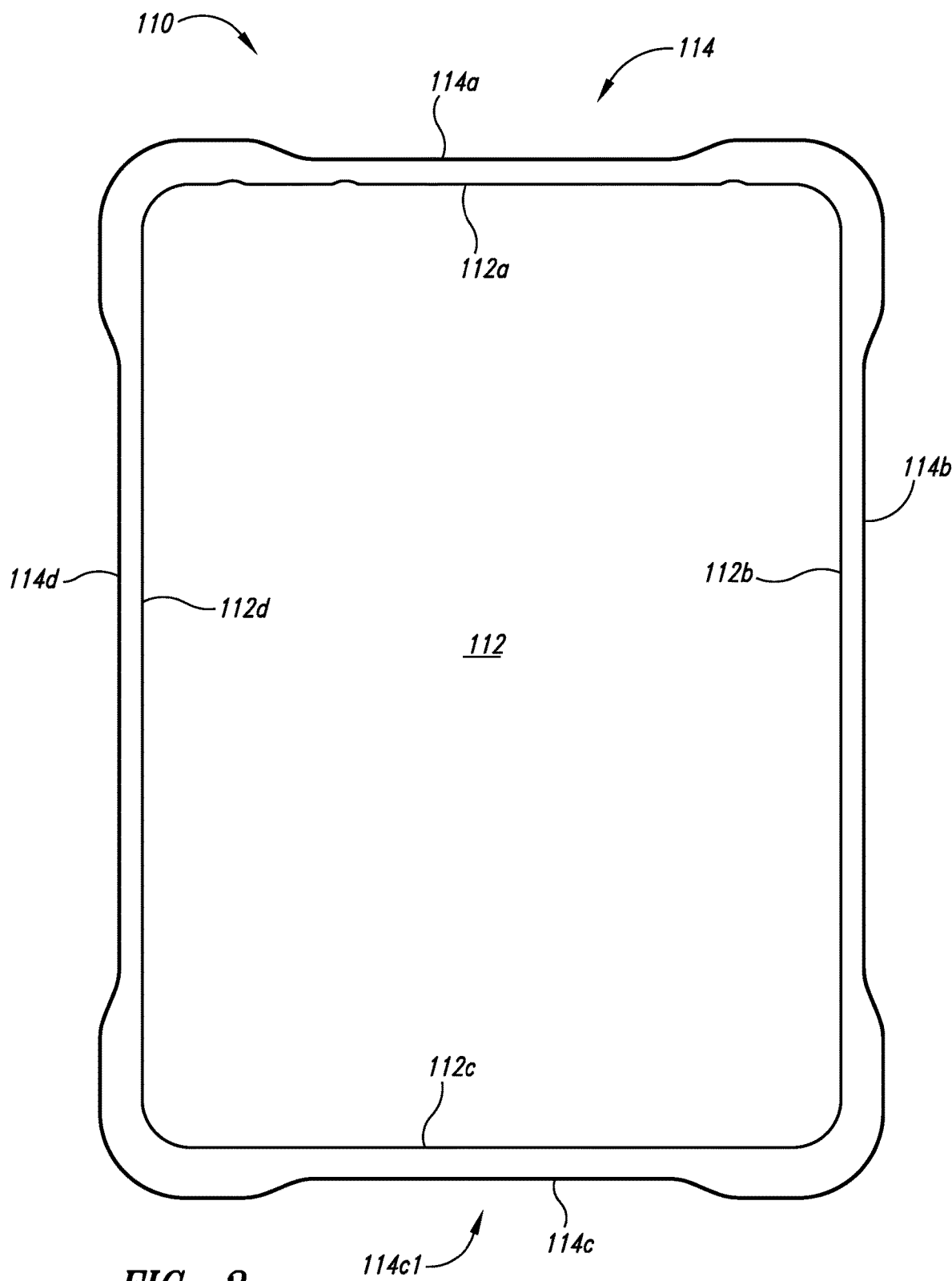
FIG. 2 is a front elevational view of a case assembly for a portable electronic device.

Turning to FIG. 2, depicted therein is a front elevational view of a case assembly for a portable electronic device. In implementations, case assembly 110 is shown to include interior base surface 112 and exterior 114. In implementations, interior base surface 112 is shown to include interior wall portion 112a, interior wall portion 112b, interior wall portion 112c, and interior wall portion 112d. In implementations, exterior 114 is shown to include side portion 114a, side portion 114b, side portion 114c with aperture 114c1, and side portion 114d.

Figure 3:
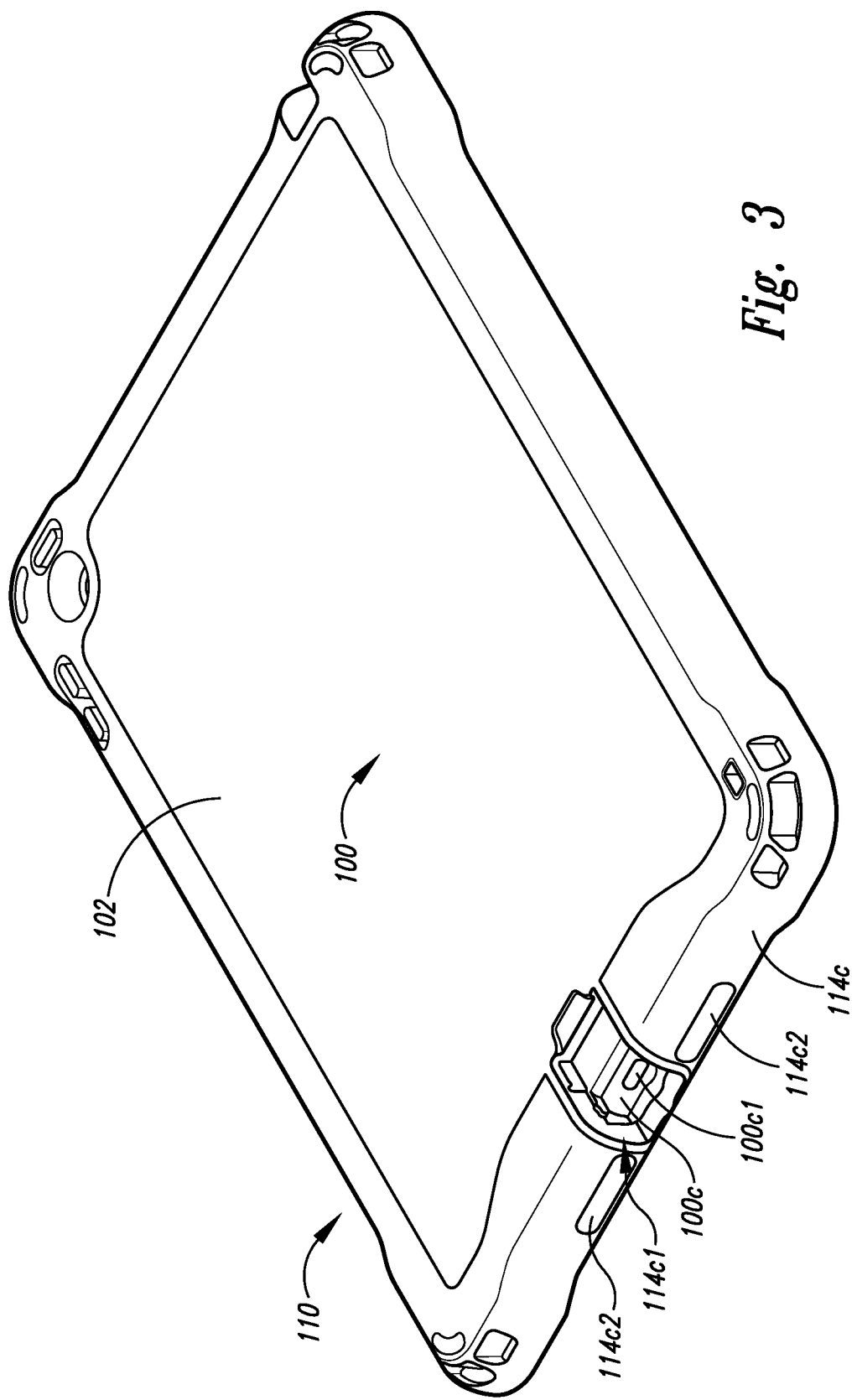
FIG. 3 is a perspective view of the case assembly of FIG. 2.

Turning to FIG. 3, depicted therein is a perspective view of the case assembly of FIG. 2. In implementations, side portion 114c is shown to include aperture 114c2.

Figure 4:
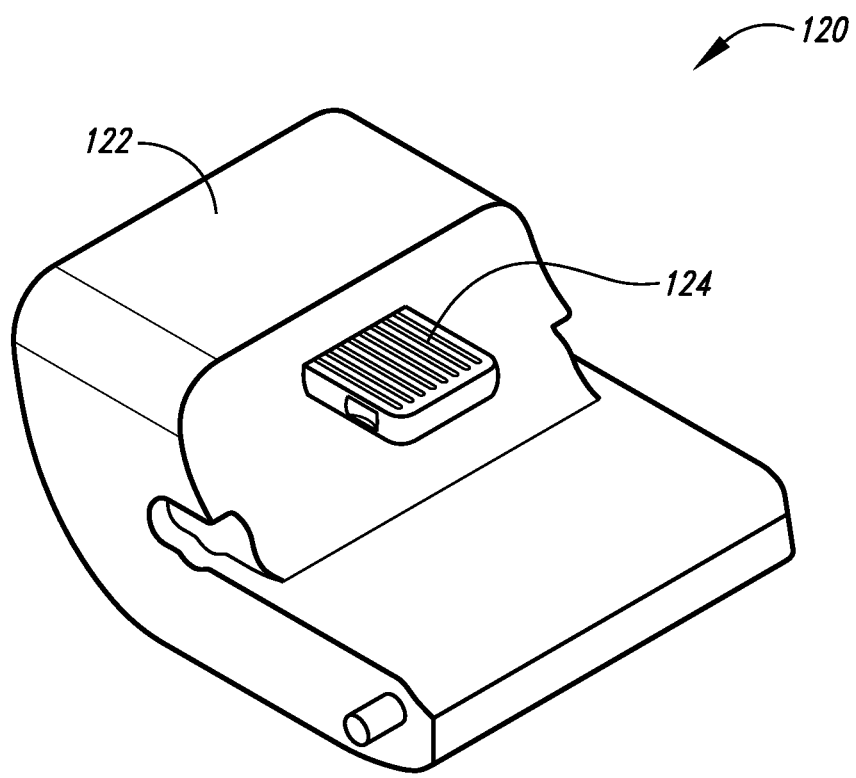
FIG. 4 is a rear perspective view of an adapter.

Turning to FIG. 4, depicted therein is a rear perspective view of an adapter. In implementations, adapter 120 is shown to include body 122, and plug 124.

Figure 5:
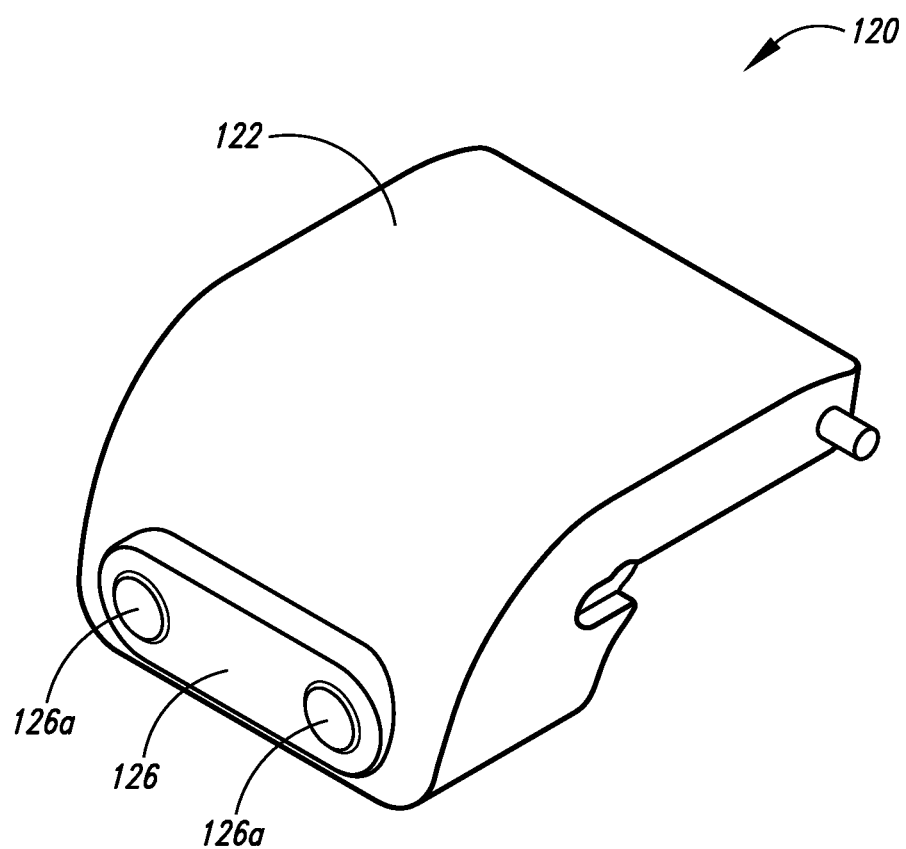
FIG. 5 is a front perspective view of the adapter of FIG. 4.

Turning to FIG. 5, depicted therein is a front perspective view of the adapter of FIG. 4. In implementations, adapter 120 is shown to include interface 126 with contact 126a.

Figure 6:
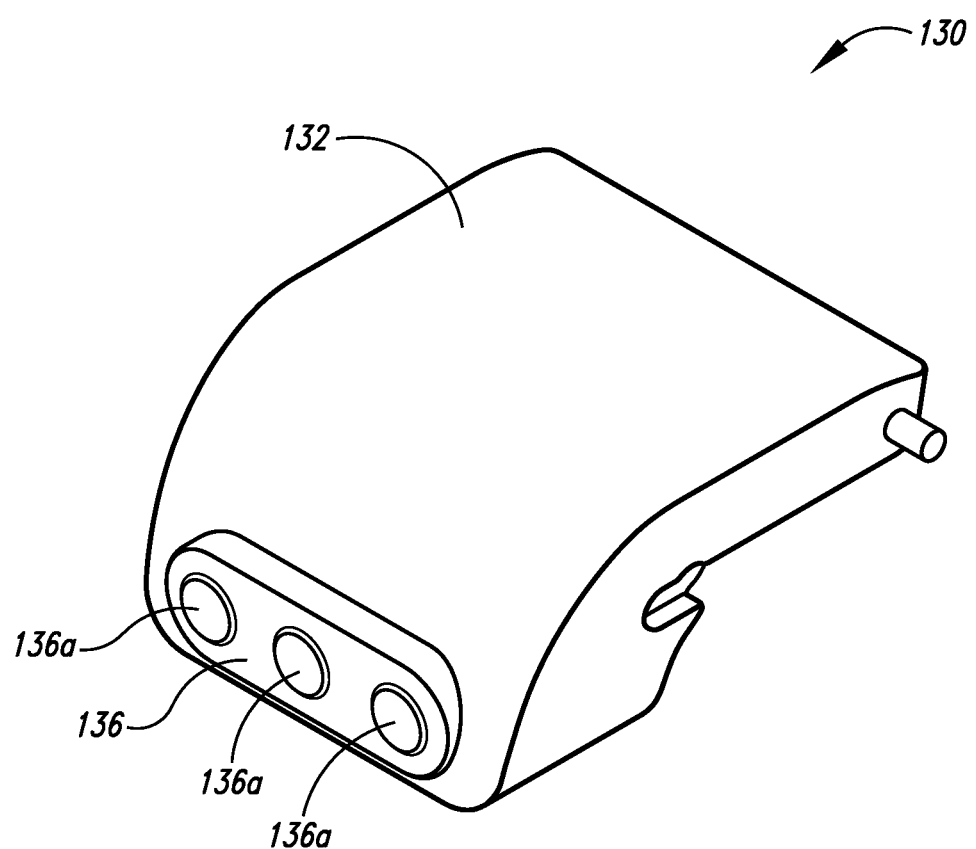
FIG. 6 is a front perspective view of an adapter.

Turning to FIG. 6, depicted therein is a front perspective view of an adapter. In implementations, adapter 130 is shown to include body 132, and interface 136. In implementations, interface 136 is shown to include contact 136a.

Figure 7:
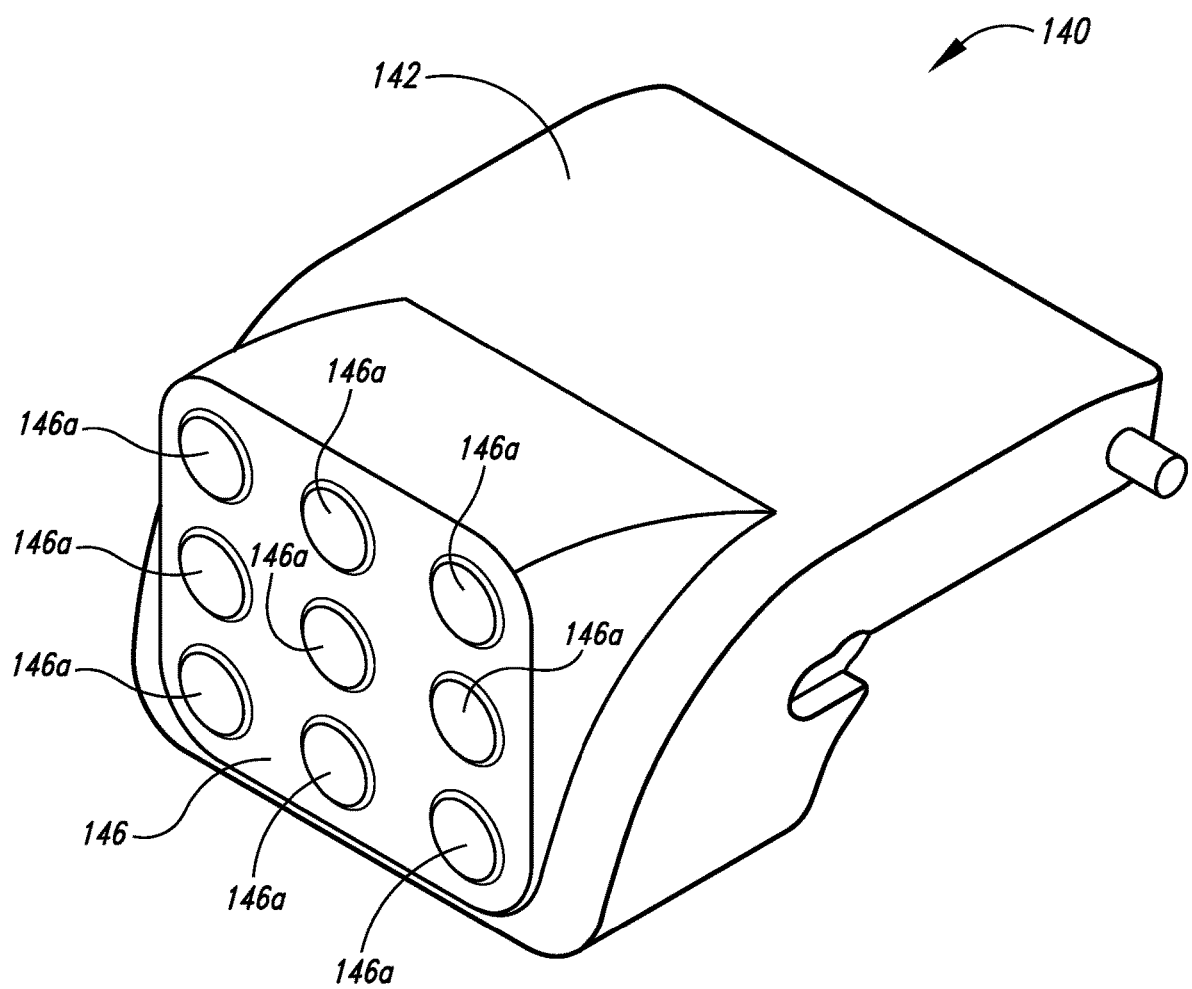
FIG. 7 is a front perspective view of an adapter.

Turning to FIG. 7, depicted therein is a front perspective view of an adapter. In implementations, adapter 140 is shown to include body 142, and interface 146. In implementations, interface 146 is shown to include contact 146a.

Figure 8:
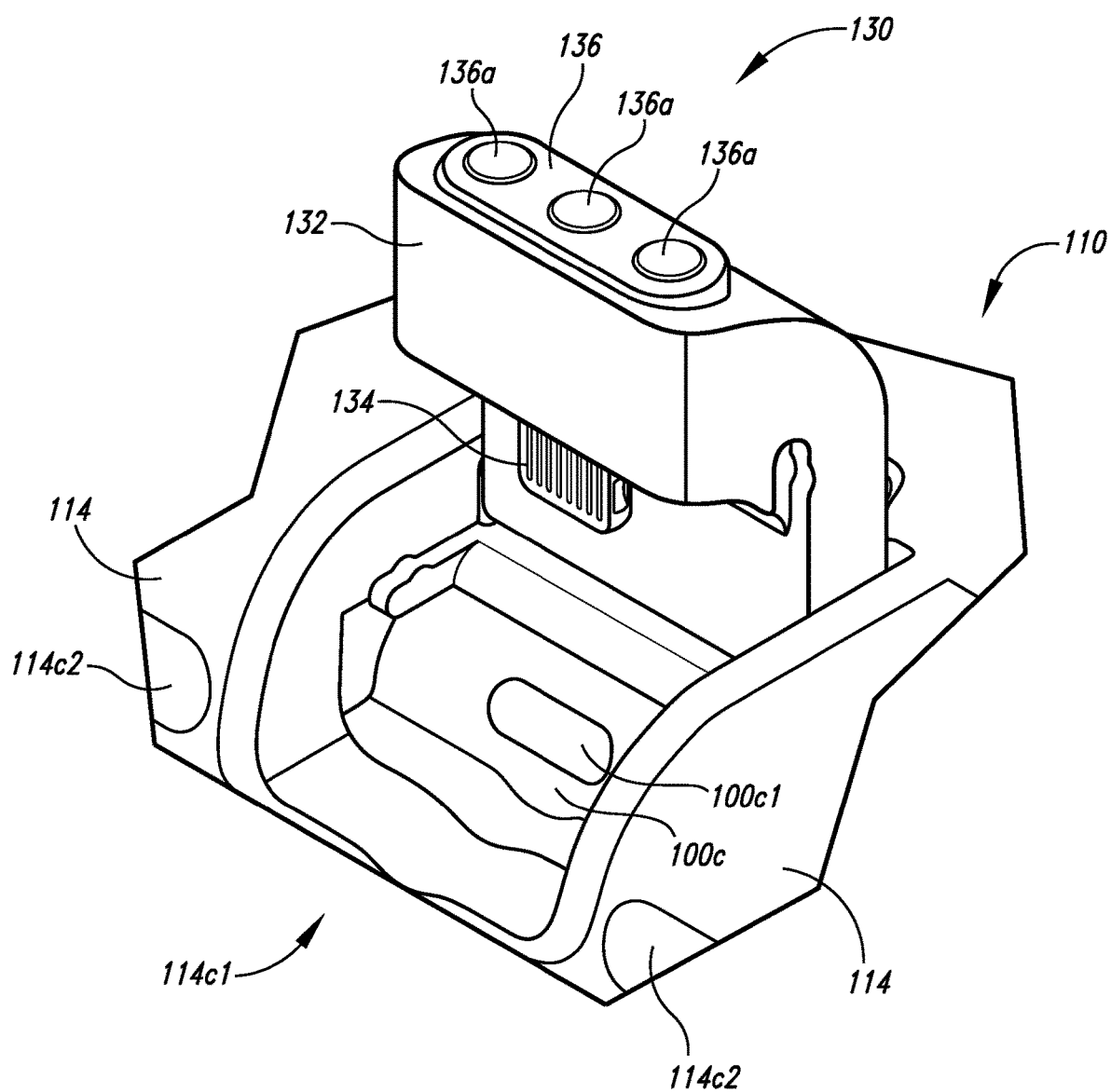
FIG. 8 is a front perspective view of the adapter of FIG. 6 partially coupled with the portable electronic device of FIG. 1.

Turning to FIG. 8, depicted therein is a front perspective view of the adapter of FIG. 6 partially coupled with the portable electronic device of FIG. 1. In implementations, adapter 130 is shown to include plug 134.

Figure 9:
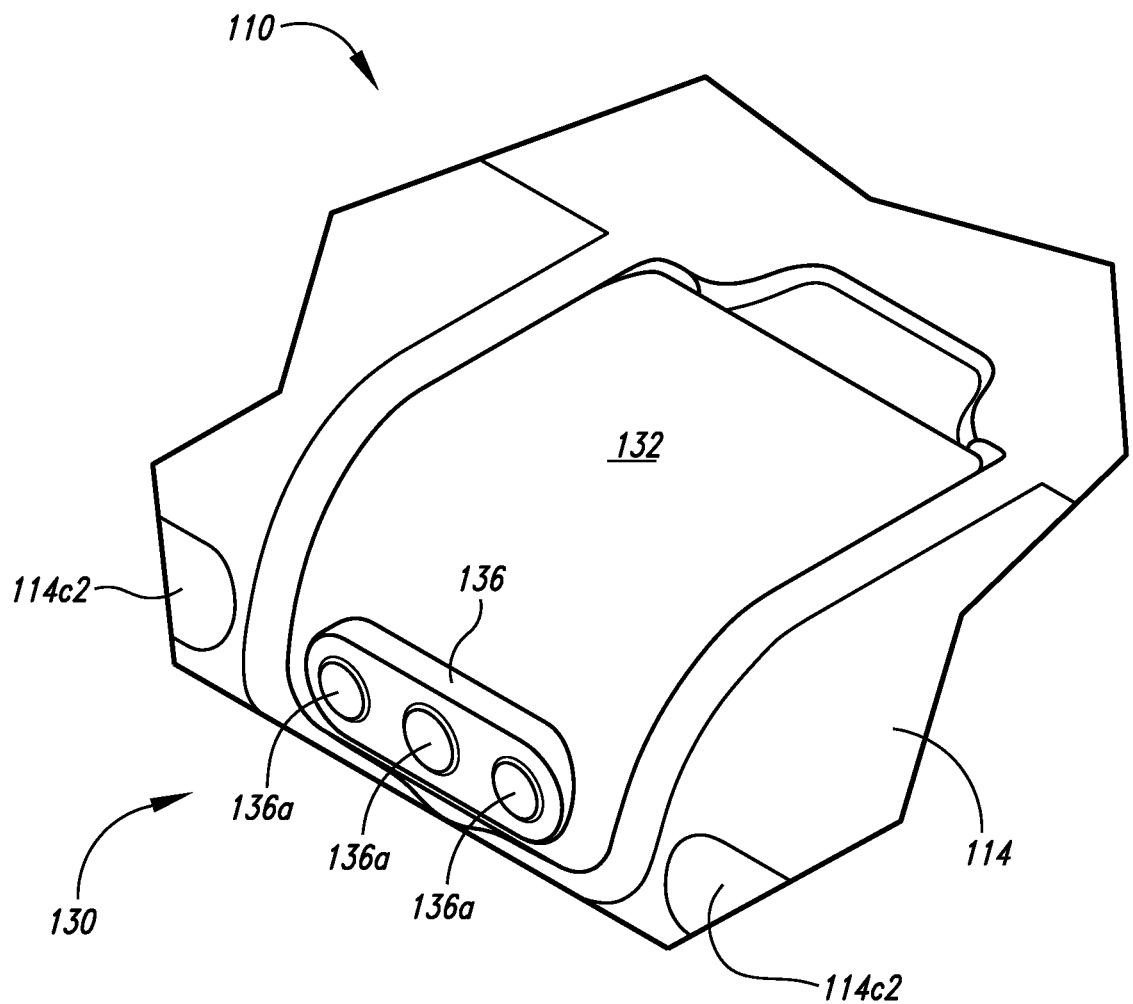
FIG. 9 is a front perspective view of the adapter of FIG. 6 fully coupled with the portable electronic device of FIG. 1.

Turning to FIG. 9, depicted therein is a front perspective view of the adapter of FIG. 6 fully coupled with the portable electronic device of FIG. 1.

Figure 10:
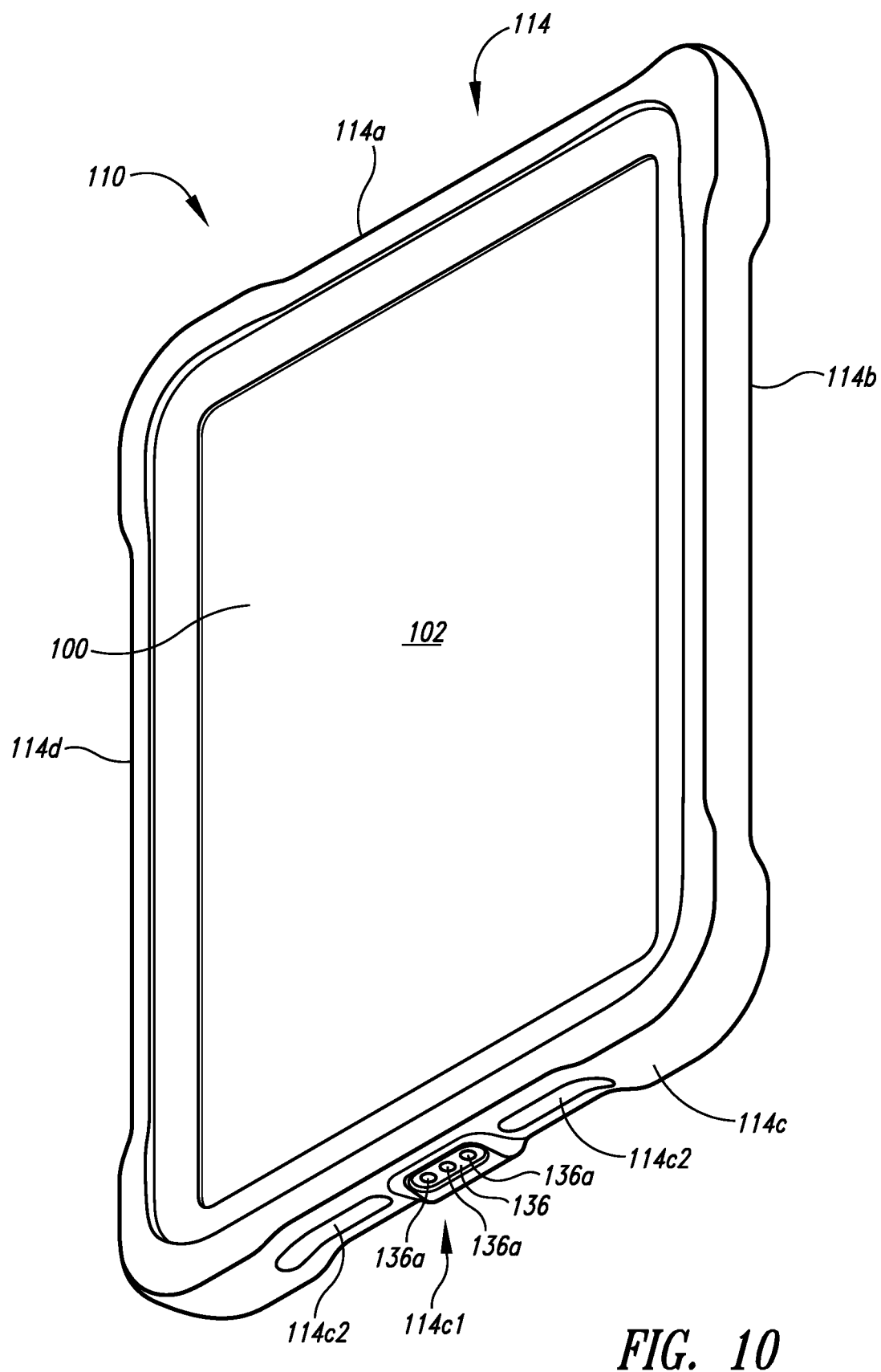
FIG. 10 is a front perspective view of the adapter of FIG. 6 fully coupled with the portable electronic device of FIG. 1, which is coupled with the case assembly of FIG. 2.

Turning to FIG. 10, depicted therein is a front perspective view of the adapter of FIG. 6 fully coupled with the portable electronic device of FIG. 1, which is coupled with the case assembly of FIG. 2.

Figure 11:
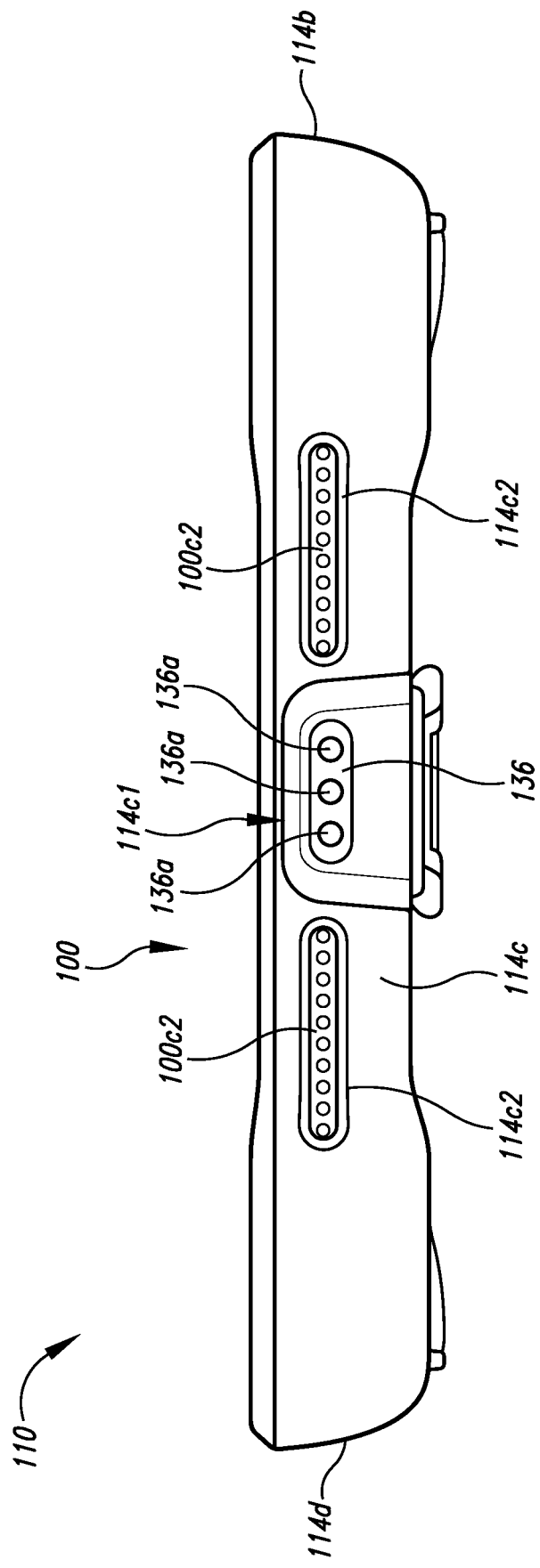
FIG. 11 is a side elevational view of the adapter of FIG. 6 fully coupled with the portable electronic device of FIG. 1, which is coupled with the case assembly of FIG. 2.

Turning to FIG. 11, depicted therein is a side elevational view of the adapter of FIG. 6 fully coupled with the portable electronic device of FIG. 1, which is coupled with the case assembly of FIG. 2. In implementations, portable electronic device 100 is shown to include speaker 100c2.

Figure 12:
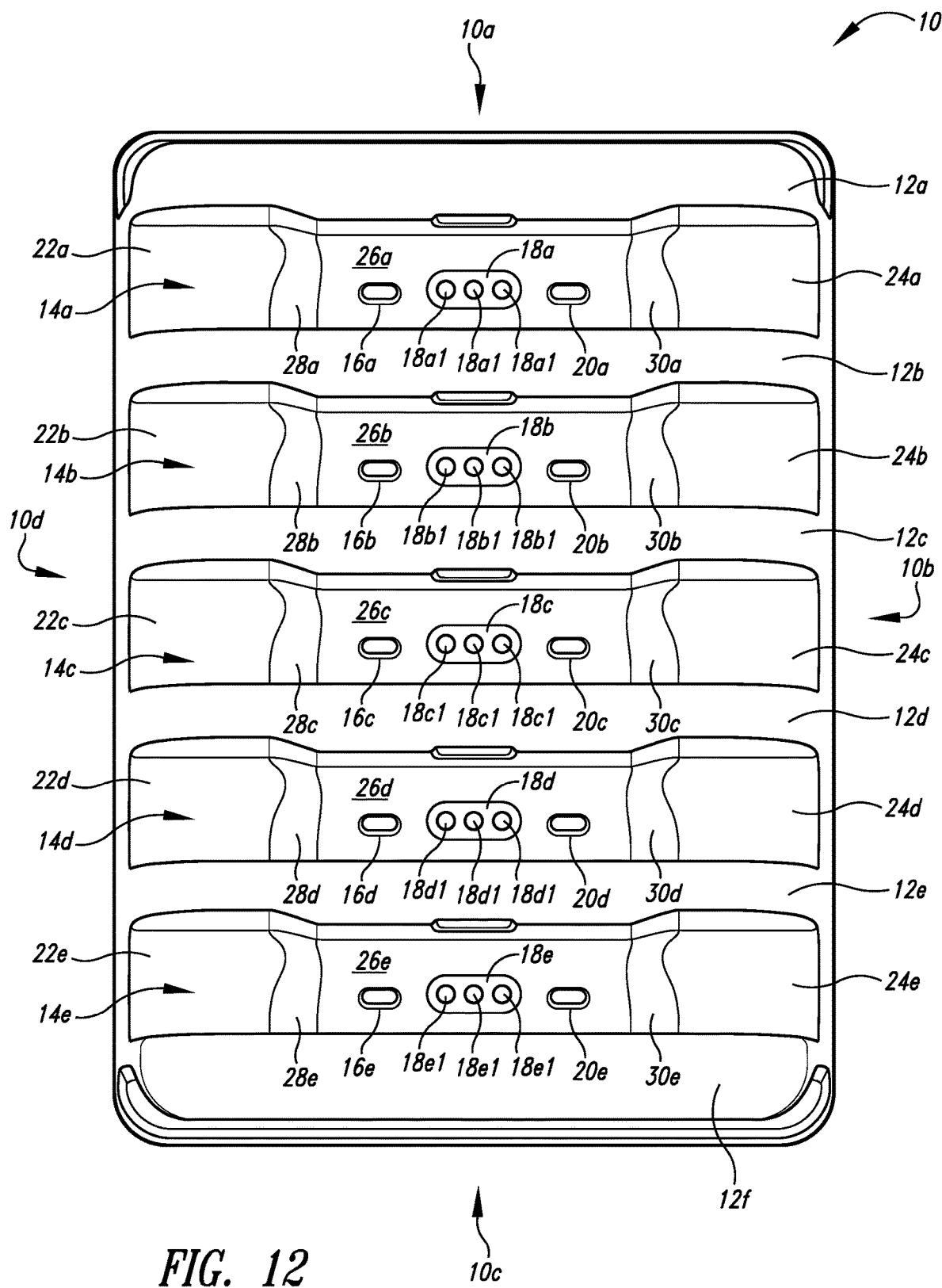
FIG. 12 is a top plan view of a station for portable electronic devices.

Turning to FIG. 12, depicted therein is a top plan view of a station for portable electronic devices. In implementations, station 10 is shown to include side 10a, side 10b, side 10c, and side 10d. In implementations, station 10 is shown to include wall 12a, wall 12b, wall 12c, wall 12d, wall 12e, and wall 12f. In implementations, station 10 is shown to include slot 14a, slot 14b, slot 14c, slot 14d, and slot 14e. In implementations, station 10 is shown to include post 16a, post 16b, post 16c, post 16d, and post 16e. In implementations, station 10 is shown to include interface 18a, interface 18b, interface 18c, interface 18d, and interface 18e. In implementations, interface 18a is shown to include contact 18a1. In implementations interface 18b is shown to include contact 18b1. In implementations, interface 18c is shown to include contact 18c1. In implementations, interface 18d is shown to include contact 18d1. In implementations, interface 18e is shown to include contact 18e1. In implementations, station 10 is shown to include post 20a, post 20b, post 20c, post 20d, and post 20e. In implementations, station 10 is shown to include lower base portion 22a, lower base portion 22b, lower base portion 22c, lower base portion 22d, and lower base portion 22e. In implementations, station 10 is shown to include lower base portion 24a, lower base portion 24b, lower base portion 24c, lower base portion 24d, and lower base portion 24e. In implementations, station 10 is shown to include elevated base portion 26a, elevated base portion 26b, elevated base portion 26c, elevated base portion 26d, and elevated base portion 26e.

Figure 13:
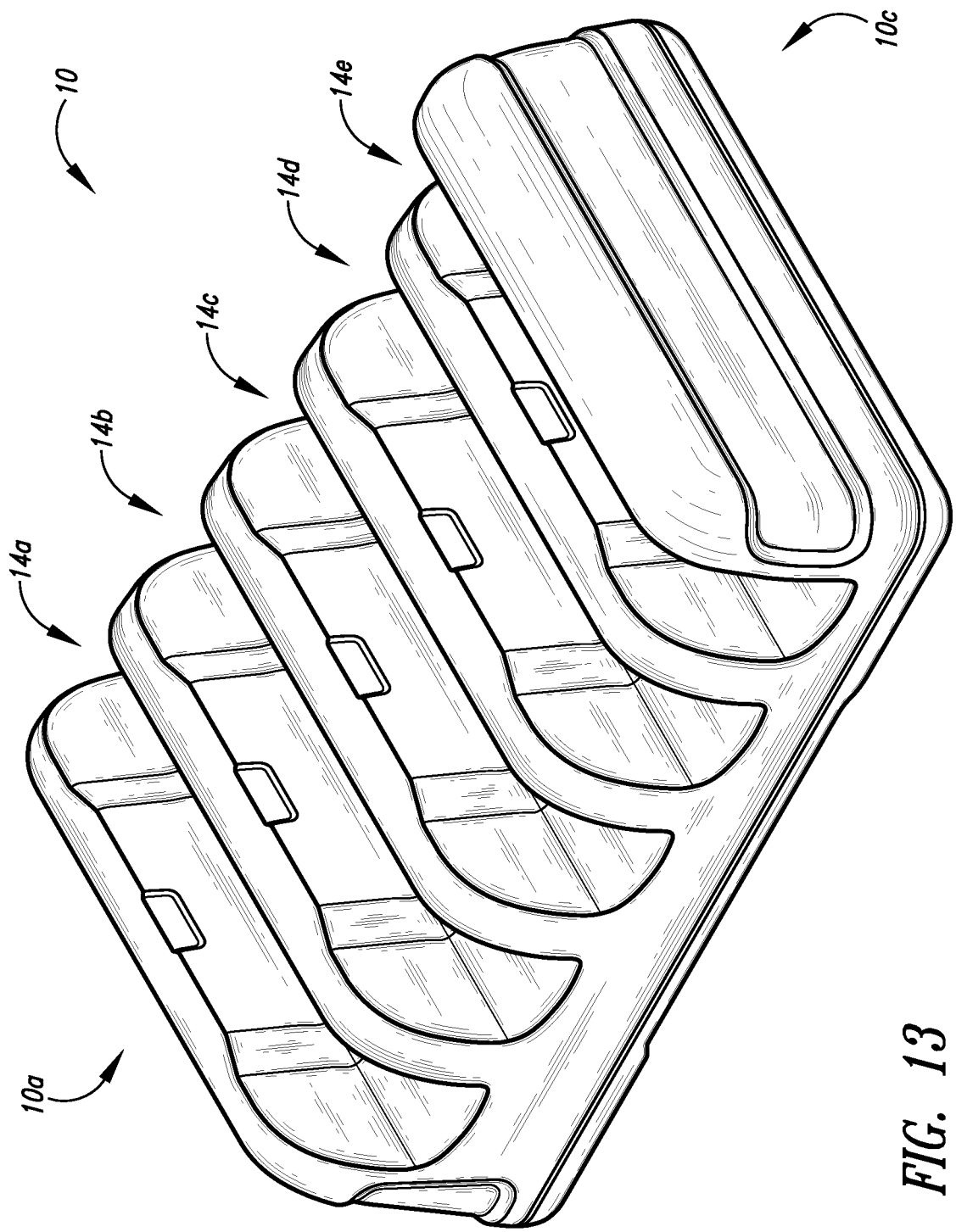
FIG. 13 is a front perspective view of a station for portable electronic devices.

Turning to FIG. 13, depicted therein is a front perspective view of a station for portable electronic devices.

Figure 14:
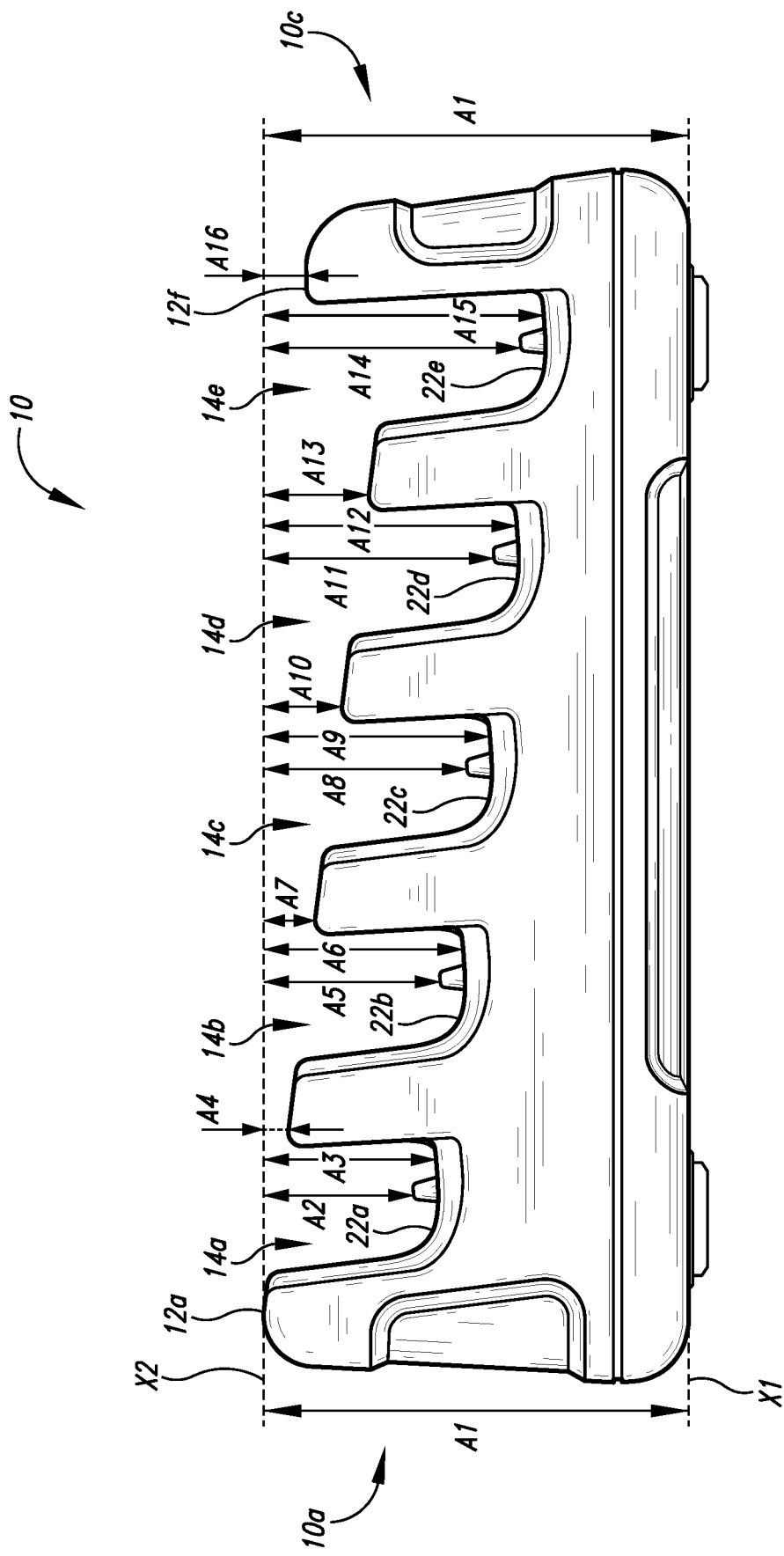
FIG. 14 is a side elevational view of a station for portable electronic devices.

Turning to FIG. 14, depicted therein is a side elevational view of a station for portable electronic devices.

Figure 15:
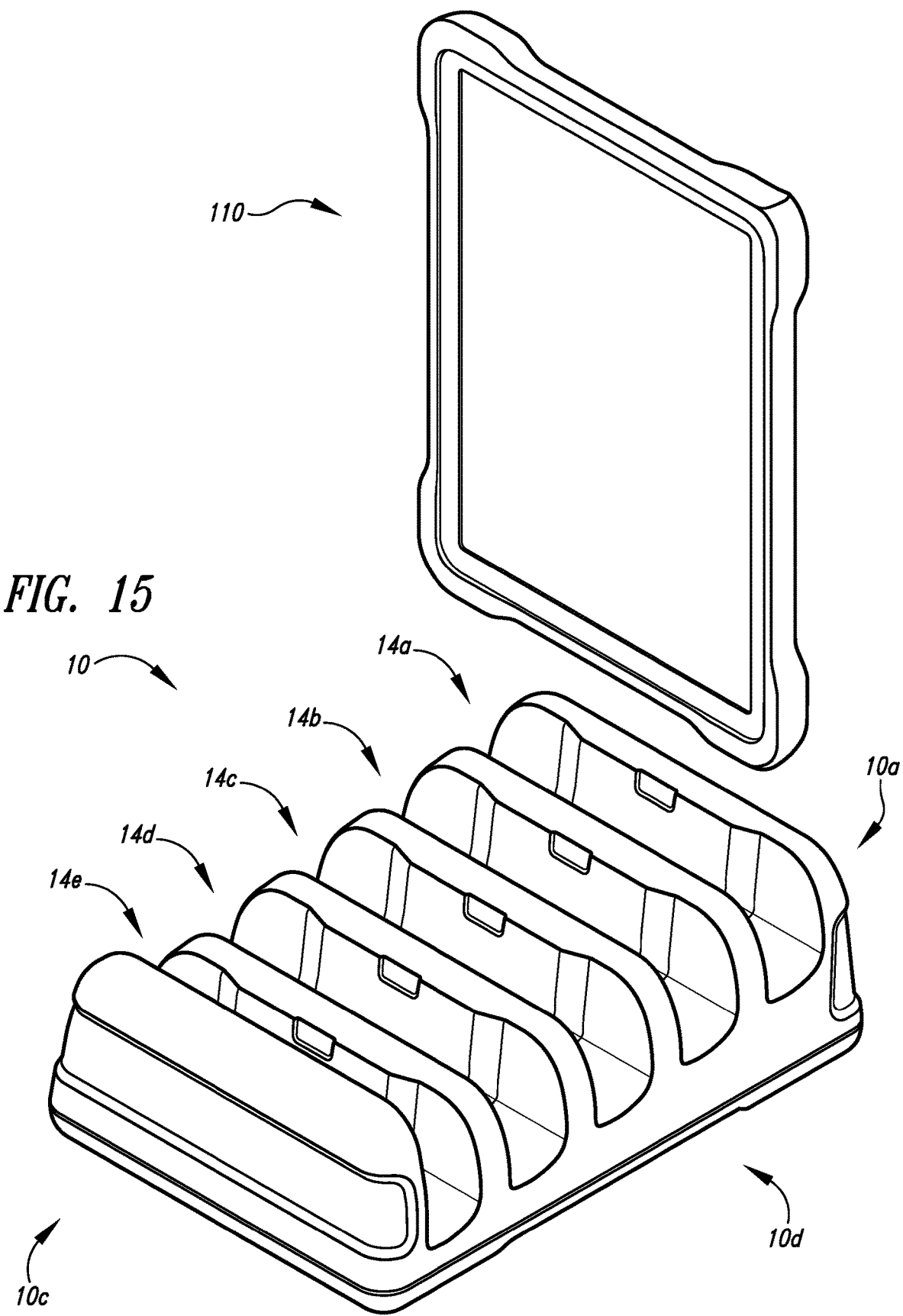
FIG. 15 is a front perspective view of the portable electronic device of FIG. 1 coupled with the case assembly of FIG. 2 and a front perspective view of station for portable electronic devices of FIG. 12 as uncoupled.

Turning to FIG. 15, depicted therein is a front perspective view of the portable electronic device of FIG. 1 coupled with the case assembly of FIG. 2 and a front perspective view of station for portable electronic devices of FIG. 12 as uncoupled. In implementations, station 10 is shown to include linear dimension A1, linear dimension A2, linear dimension A3, linear dimension A4, linear dimension A5, linear dimension A6, linear dimension A7, linear dimension A8, linear dimension A9, linear dimension A10, linear dimension A11, linear dimension A12, linear dimension A13, linear dimension A14, linear dimension A15, linear dimension A16, and linear dimension A17.

Figure 16:
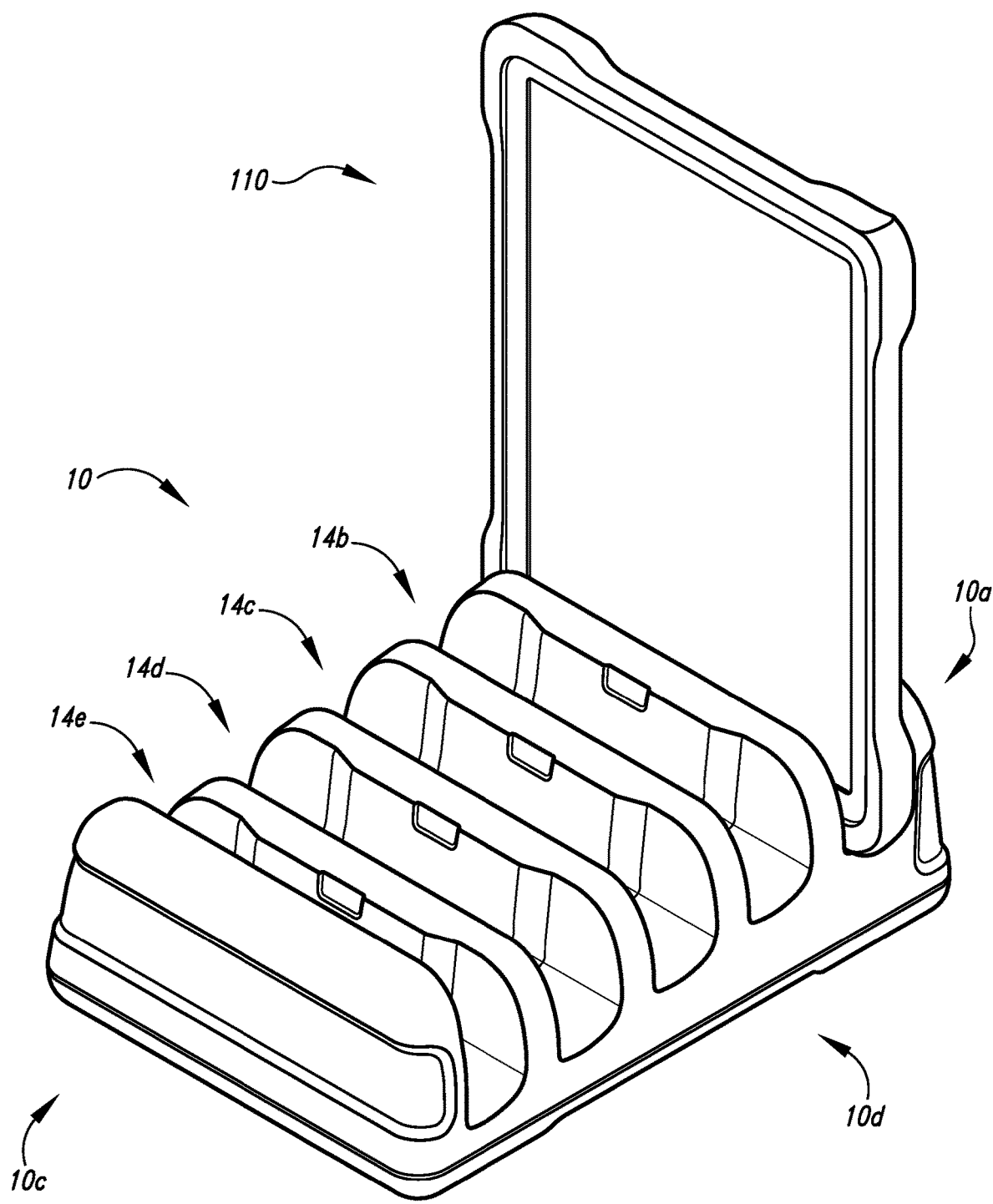
FIG. 16 is a front perspective view of the portable electronic device of FIG. 1 coupled with the case assembly of FIG. 2 and a front perspective view of station for portable electronic devices of FIG. 12 as coupled.

Turning to FIG. 16, depicted therein is a front perspective view of the portable electronic device of FIG. 1 coupled with the case assembly of FIG. 2 and a front perspective view of station for portable electronic devices of FIG. 12 as coupled.

Figure 17:
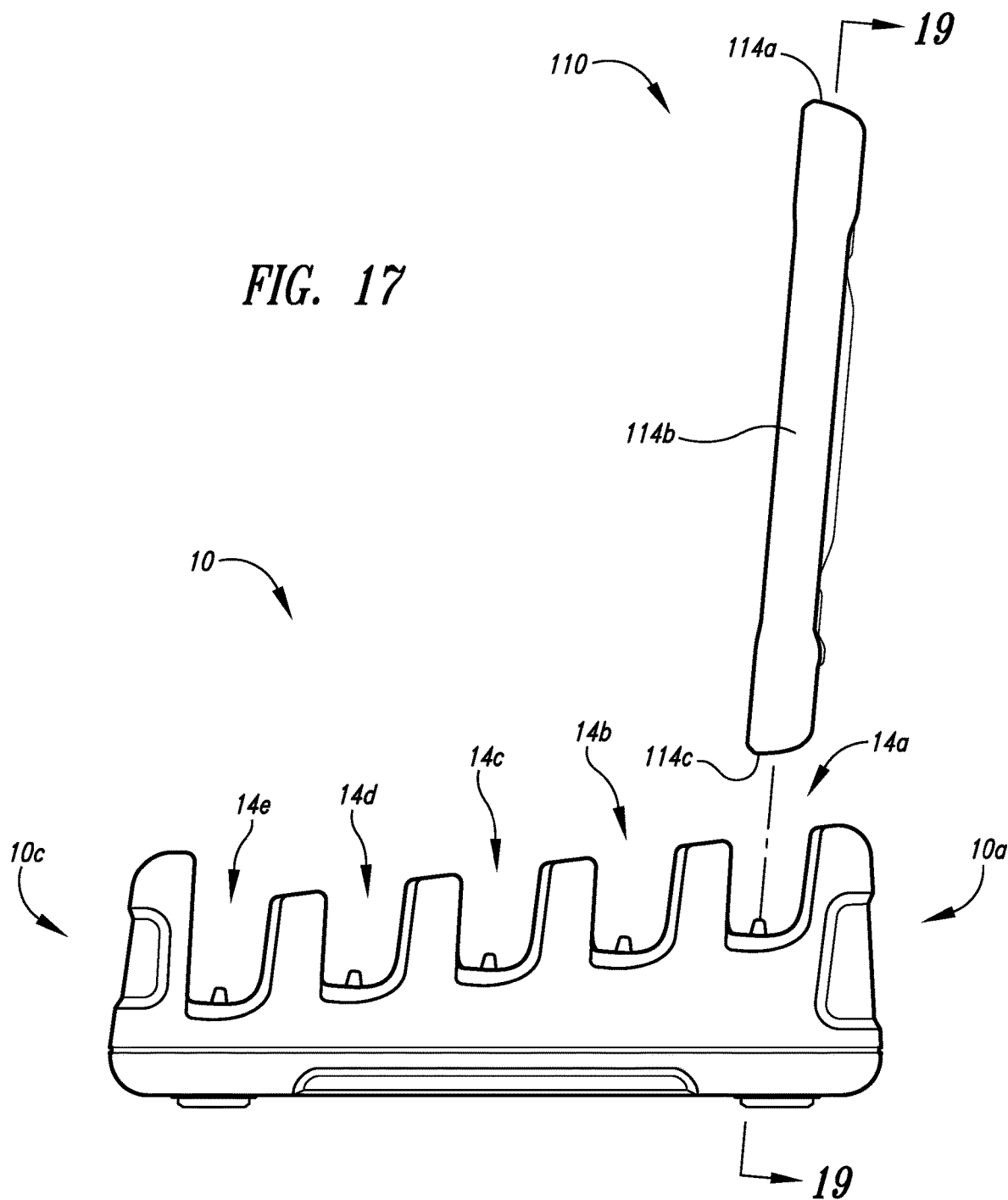
FIG. 17 is a side elevational view of the portable electronic device of FIG. 1 coupled with the case assembly of FIG. 2 and a front perspective view of station for portable electronic devices of FIG. 12 as uncoupled.

Turning to FIG. 17, depicted therein is a side elevational view of the portable electronic device of FIG. 1 coupled with the case assembly of FIG. 2 and a front perspective view of station for portable electronic devices of FIG. 12 as uncoupled.

Figure 18:
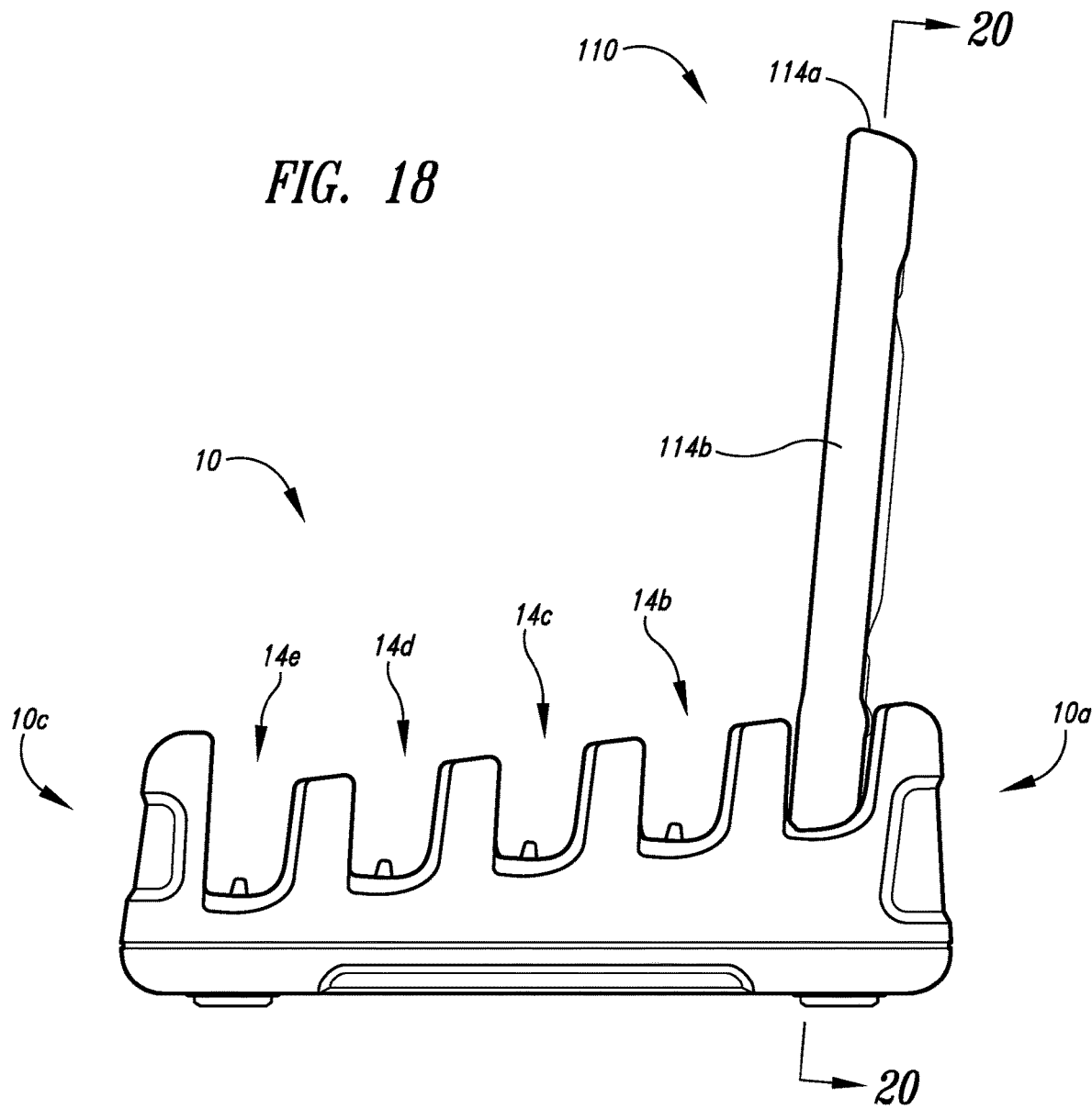
FIG. 18 is a side elevational view of the portable electronic device of FIG. 1 coupled with the case assembly of FIG. 2 and a front perspective view of station for portable electronic devices of FIG. 12 as coupled.

Turning to FIG. 18, depicted therein is a side elevational view of the portable electronic device of FIG. 1 coupled with the case assembly of FIG. 2 and a front perspective view of station for portable electronic devices of FIG. 12 as coupled.

Figure 19:
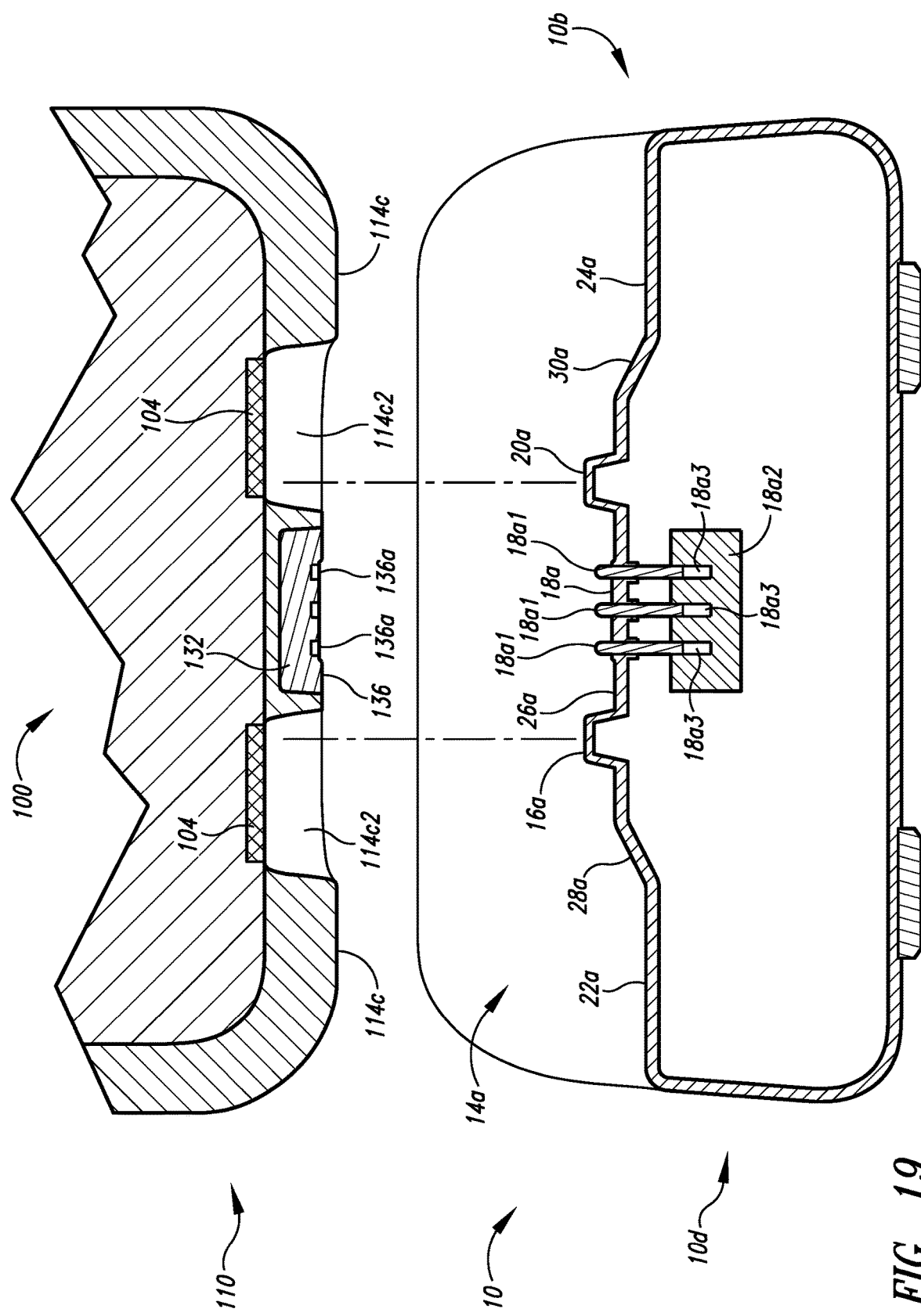
FIG. 19 is a cross-sectional side-elevational view of the portable electronic device and station for portable electronic devices taken along the 19-19 cut line of FIG. 17.

Turning to FIG. 19, depicted therein is a cross-sectional side-elevational view of the portable electronic device and station for portable electronic devices taken along the 19-19 cut line of FIG. 17.

Figure 20:
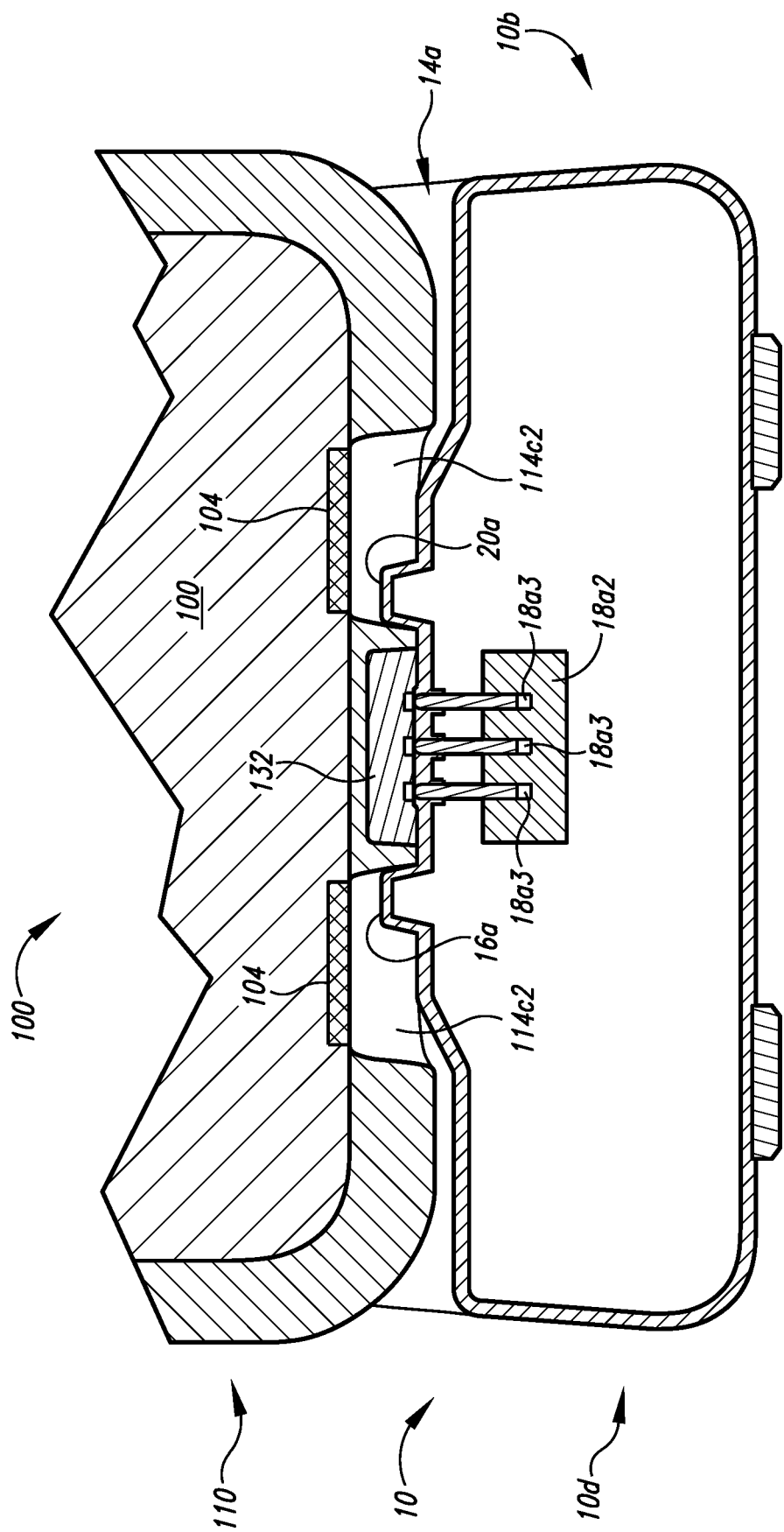
FIG. 20 is a cross-sectional side-elevational view of the portable electronic device and station for portable electronic devices taken along the 20-20 cut line of FIG. 18.

Turning to FIG. 20, depicted therein is a cross-sectional side-elevational view of the portable electronic device and station for portable electronic devices taken along the 20-20 cut line of FIG. 18. In implementations, station 10 is shown to include bevel portion 28a and bevel portion 30a. In implementations interface 18a is shown to include well 18a3. In implementations portable electronic device 100 is shown to include speaker 104.

Figure 21:
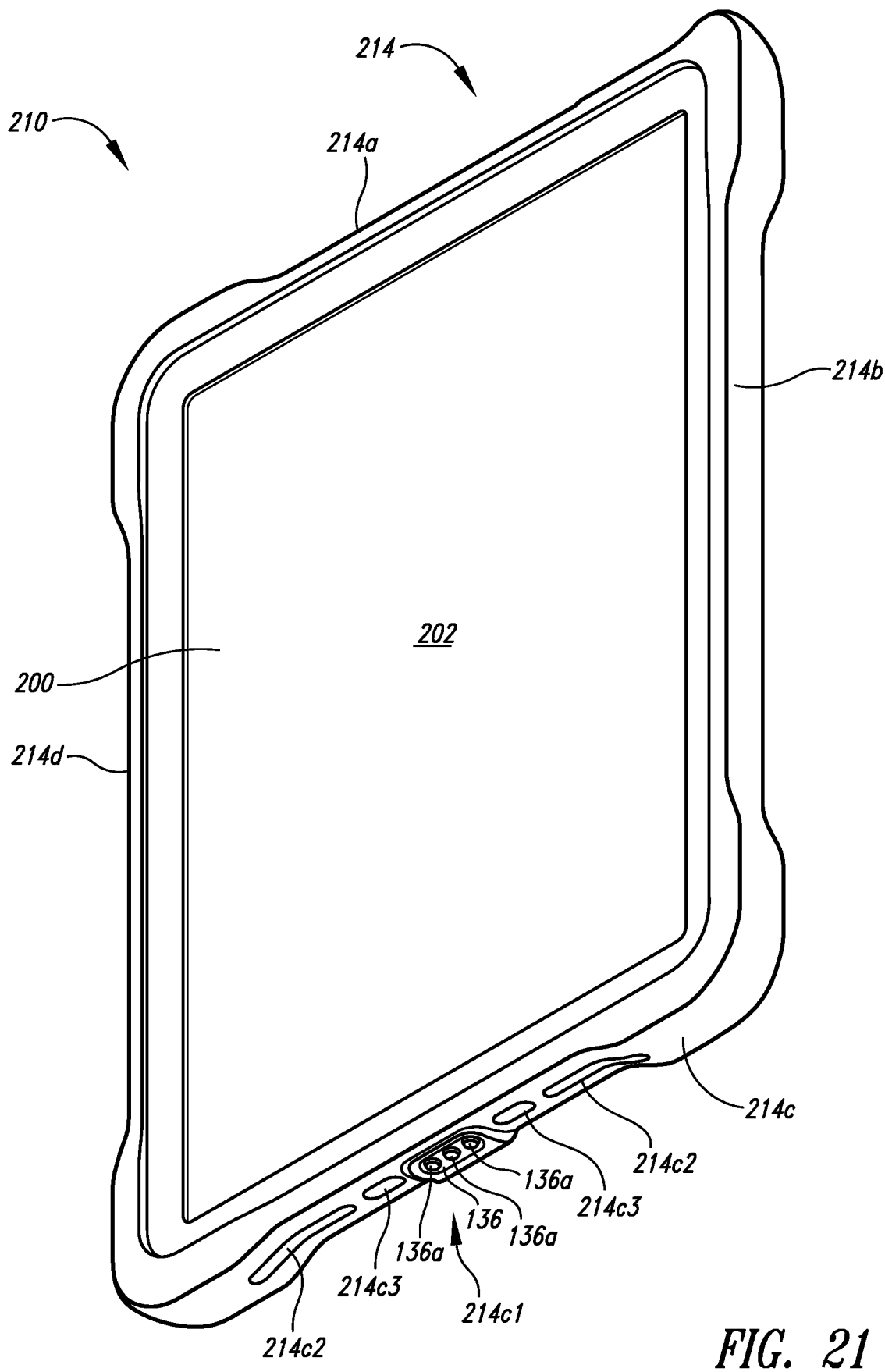
FIG. 21 is a front perspective view of an adapter fully coupled with a portable electronic device, which is coupled with a case assembly.

Turning to FIG. 21, depicted therein is a front perspective view of an adapter fully coupled with a portable electronic device, which is coupled with a case assembly.

Figure 22:
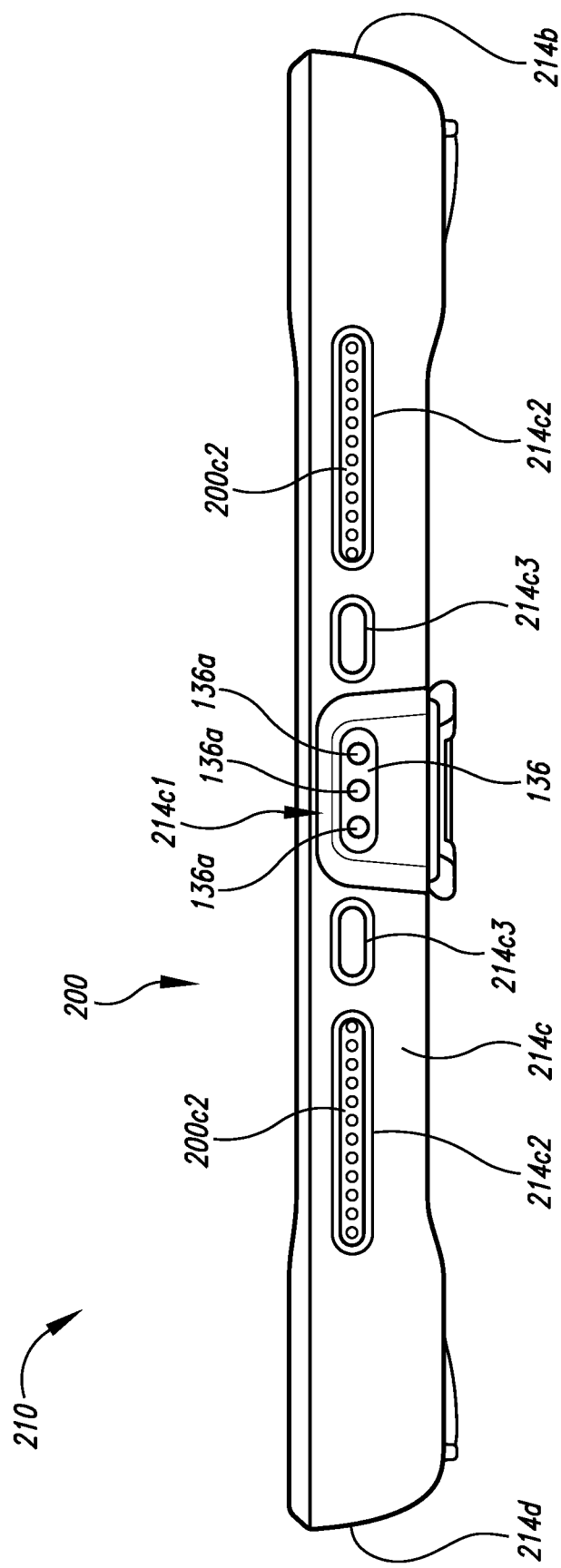
FIG. 22 is a side elevational view of the adapter of FIG. 21 fully coupled with the portable electronic device of FIG. 21, which is coupled with the case assembly of FIG. 21.

Turning to FIG. 22, depicted therein is a side elevational view of the adapter of FIG. 21 fully coupled with the portable electronic device of FIG. 21, which is coupled with the case assembly of FIG. 21. In implementations, portable electronic device 200, display surface 202, case assembly 210, and exterior 214 In implementations, exterior 214 is shown to include side portion 214a, side portion 214b, side portion 214c, and side portion 214d. In implementations, side portion 214c is shown to include aperture 214c1, aperture 214c2, and aperture 214c3.

Figure 23:
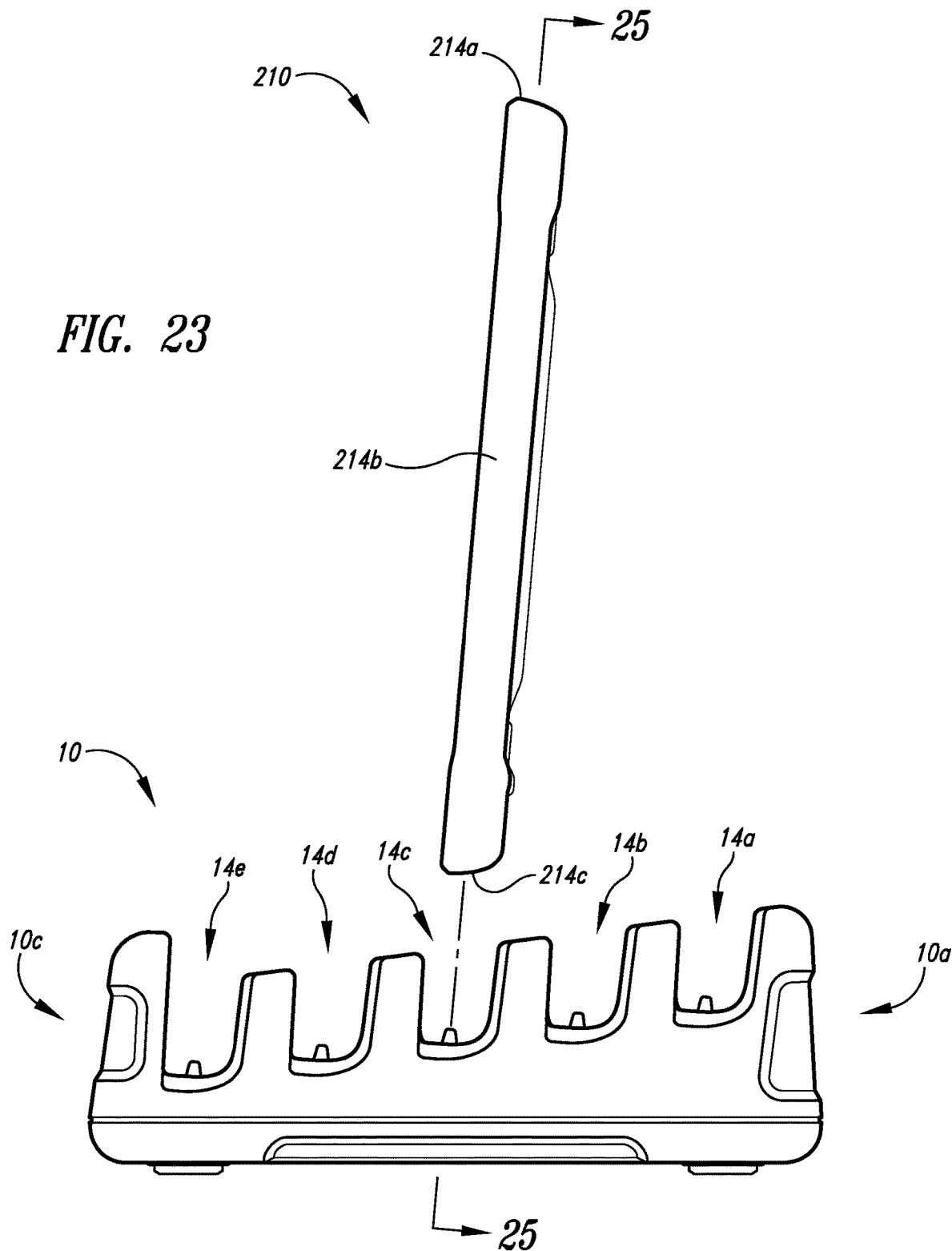
FIG. 23 is a side elevational view of the portable electronic device of FIG. 21 coupled with the case assembly of FIG. 21 and a front perspective view of station for portable electronic devices of FIG. 21 as uncoupled.

Turning to FIG. 23, depicted therein is a side elevational view of the portable electronic device of FIG. 21 coupled with the case assembly of FIG. 21 and a front perspective view of station for portable electronic devices of FIG. 21 as uncoupled.

Figure 24:
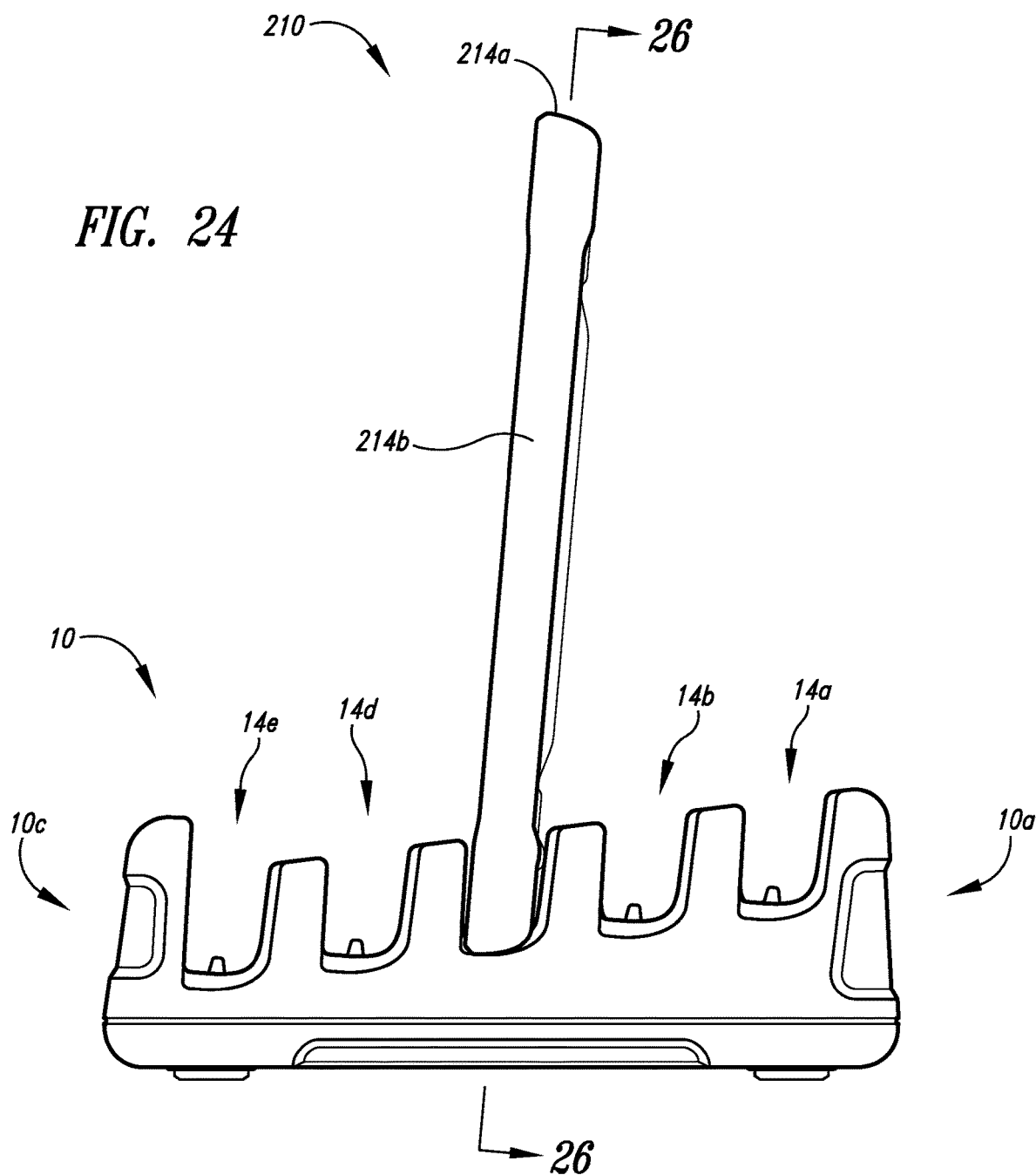
FIG. 24 is a side elevational view of the portable electronic device of FIG. 21 coupled with the case assembly of FIG. 21 and a front perspective view of station for portable electronic devices of FIG. 21 as coupled.

Turning to FIG. 24, depicted therein is a side elevational view of the portable electronic device of FIG. 21 coupled with the case assembly of FIG. 21 and a front perspective view of station for portable electronic devices of FIG. 21 as coupled.

Figure 25:
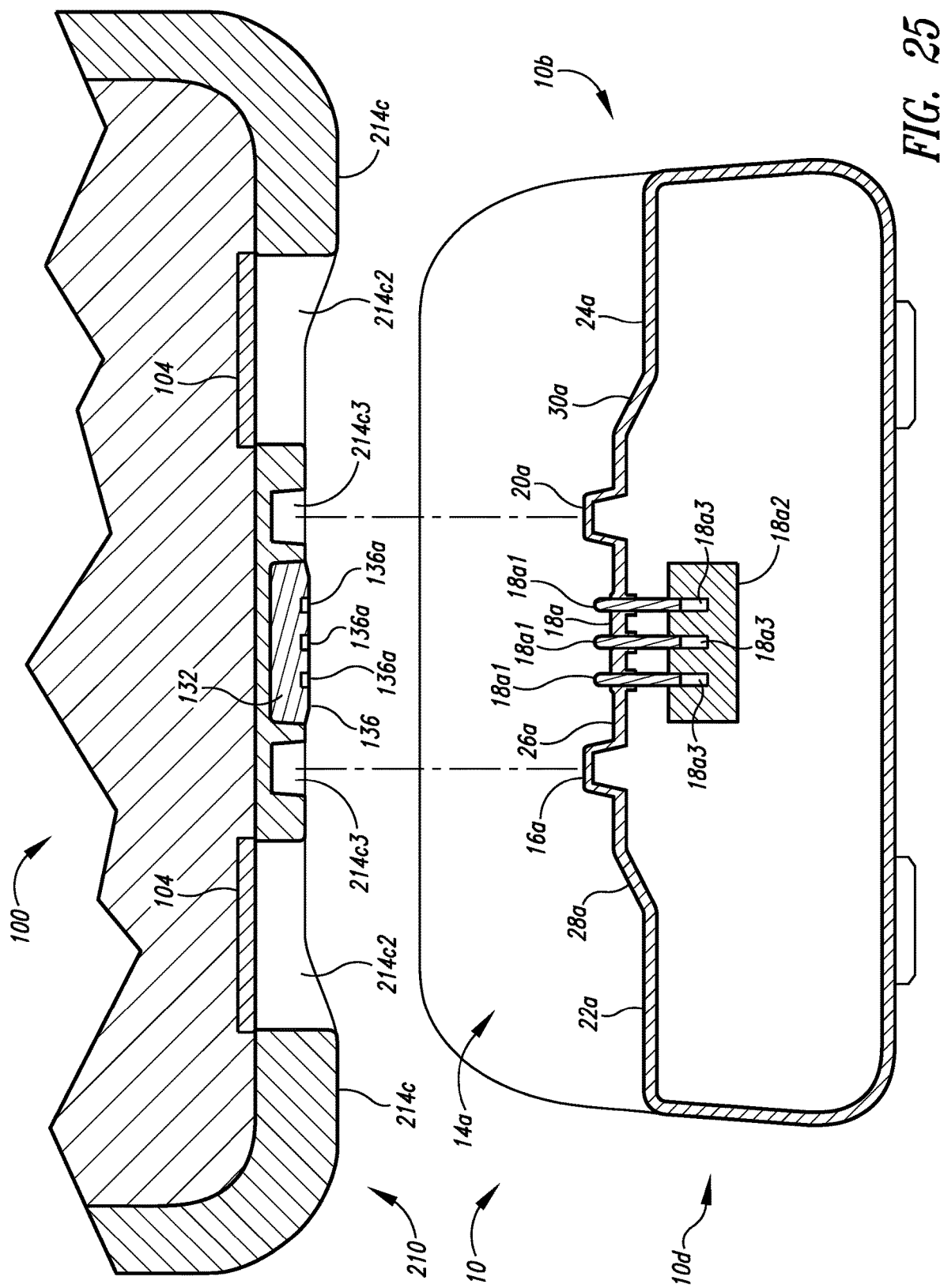
FIG. 25 is a cross-sectional side-elevational view of the portable electronic device and station for portable electronic devices taken along the 25-25 cut line of FIG. 23.

Turning to FIG. 25, depicted therein is a cross-sectional side-elevational view of the portable electronic device and station for portable electronic devices taken along the 25-25 cut line of FIG. 23.

Figure 26:
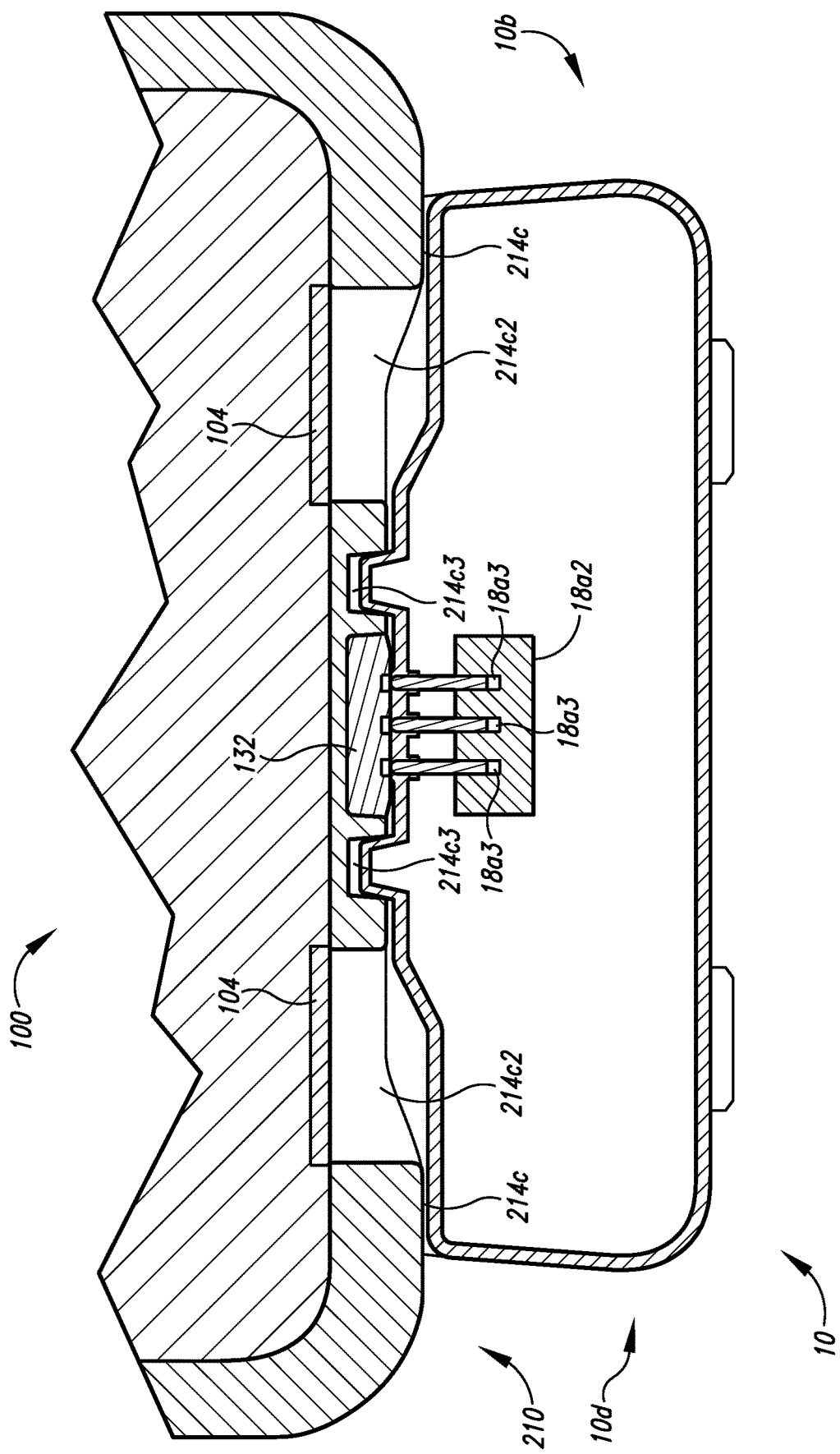
FIG. 26 is a cross-sectional side-elevational view of the portable electronic device and station for portable electronic devices taken along the 26-26 cut line of FIG. 24.

Turning to FIG. 26, depicted therein is a cross-sectional side-elevational view of the portable electronic device and station for portable electronic devices taken along the 26-26 cut line of FIG. 24.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system comprising:
   at least one base;
   at least two walls positioned on either side of the at least one base;
   at least one slot defined at least in part by the at least two walls and the at least one base;
   at least one post extending from the at least one base; and
   at least one interface including at least one electrically conductive contact extending from the at least one base,
   wherein the at least one base includes at least one elevated base portion and at least one lower base portion positioned lower than the at least one elevated base portion, and
   wherein the at least one lower base portion includes at least two lower base portions positioned on either side of the at least one elevated base portion.

2. The system of claim 1 wherein the at least one electrically conductive contact includes at least two posts positioned on either side of the at least one interface.

3. A system comprising:
   at least one base;
   at least two walls positioned on either side of the at least one base;
   at least one slot defined at least in part by the at least two walls and the at least one base;
   at least one post extending from the at least one base; and
   at least one interface including at least one electrically conductive contact extending from the at least one base,
   wherein the at least one base includes at least one elevated base portion and at least one lower base portion positioned lower than the at least one elevated base portion, and
   wherein the at least one base includes at least one bevel portion positioned between the at least one lower base portion and the at least one elevated base portion.

4. The system of claim 3 wherein the at least one base includes at least one elevated base portion and at least one lower base portion positioned lower than the at least one elevated base portion.

5. The system of claim 3 wherein the at least one interface and the at least one post extend from the at least one elevated base portion.

6. A system comprising:
   at least one base;
   at least two walls positioned on either side of the at least one base;
   at least one slot defined at least in part by the at least two walls and the at least one base;
   at least one post extending from the at least one base; and
   at least one interface including at least one electrically conductive contact extending from the at least one base,
   wherein the at least one slot includes at least one first slot and at least one second slot, and wherein the at least one base portion of the at least one first slot is positioned lower than the at least one base portion of the at least one second slot.

7. The system of claim 6 wherein the at least one electrically conductive contact conduct electrical current to provide electrical power.

8. The system of claim 6 wherein the at least one electrically conductive contact conduct electrical current for communication.

9. A system comprising:
   at least one base;
   at least two walls positioned on either side of the at least one base;
   at least one slot defined at least in part by the at least two walls and the at least one base;
   at least one post extending from the at least one base; and
   at least one interface including at least one electrically conductive contact extending from the at least one base,
   wherein the at least one electrically conductive contact adjustably extend from the at least one base.

10. The system of claim 9 wherein the at least one electrically conductive contact adjustably extend through spring-loaded bias from the at least one base.

11. The system of claim 9 wherein the at least one electrically conductive contact extend in lesser extent in a first direction when force is applied to the at least one electrically conductive contact in a second direction opposite to the first direction.

12. The system of claim 9 wherein the at least one electrically conductive contact include electrically conductive pogo pins.

13. A system comprising:
    at least one base;
    at least two walls positioned on either side of the at least one base;
    at least one slot defined at least in part by the at least two walls and the at least one base;
    at least one post extending from the at least one base; and
    at least one interface including at least one electrically conductive contact extending from the at least one base,
    wherein the at least one post includes a tapered shape.

14. The system of claim 13 wherein the at least one post is electrically nonconductive.

15. The system of claim 13 wherein the at least slot includes a plurality of slots.

16. A system comprising:
    at least one base;
    at least two walls positioned on either side of the at least one base;
    at least one slot defined at least in part by the at least two walls and the at least one base;
    at least one post extending from the at least one base; and
    at least one interface including at least one electrically conductive contact extending from the at least one base,
    wherein the at least one post includes a height of between one quarter inches and three quarters inches.

17. A system comprising:
    at least one base;
    at least two walls positioned on either side of the at least one base;
    at least one slot defined at least in part by the at least two walls and the at least one base;
    at least one post extending from the at least one base; and at least one interface including at least one electrically conductive contact extending from the at least one base, wherein the at least one post includes a height of at least three eighths inches.

* * * * *